United States Patent
Aoki et al.

(10) Patent No.: US 10,422,479 B2
(45) Date of Patent: Sep. 24, 2019

(54) CONTROL METHOD FOR ENERGY SOURCE SUPPLY SYSTEM THAT STORES AN ENERGY SOURCE AND SUPPLIES THE ENERGY SOURCE TO ONE OR MORE VEHICLES

(71) Applicant: Panasonic Intellectual Property Management Co., Ltd., Osaka (JP)

(72) Inventors: Hideshi Aoki, Osaka (JP); Akira Asai, Osaka (JP); Mikiya Nakata, Nara (JP); Mikiko Matsuo, Nara (JP); Norihiro Miyamura, Hyogo (JP); Ryunosuke Inui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 15/335,580

(22) Filed: Oct. 27, 2016

(65) Prior Publication Data
US 2017/0138539 A1 May 18, 2017

(30) Foreign Application Priority Data
Nov. 18, 2015 (JP) ................................. 2015-226080

(51) Int. Cl.
*G05B 21/00* (2006.01)
*G01M 1/38* (2006.01)
(Continued)

(52) U.S. Cl.
CPC ............... *F17C 5/06* (2013.01); *F17C 5/007* (2013.01); *B60K 2015/03197* (2013.01);
(Continued)

(58) Field of Classification Search
CPC ....................................................... F17C 5/06
(Continued)

(56) References Cited

U.S. PATENT DOCUMENTS

| | | | | |
|---|---|---|---|---|
| 2003/0083848 A1* | 5/2003 | Kami | ...................... | F17C 5/007 702/187 |
| 2005/0178463 A1* | 8/2005 | Kountz | ..................... | F17C 9/02 141/4 |

(Continued)

FOREIGN PATENT DOCUMENTS

JP 2002-315111 10/2002

*Primary Examiner* — Md Azad
(74) *Attorney, Agent, or Firm* — Greenblum & Bernstein, P.L.C.

(57) ABSTRACT

A control method comprises: receiving from a first vehicle, first information including a first required amount of the energy source; receiving from a second vehicle, second information including a second required amount of the energy source; and determining, when a total sum of required amounts of the energy source received from two or more vehicles including the first vehicle and the second vehicle is larger than a remaining amount in a storage reservoir, i) a first reserved supply amount of the energy source for the first vehicle, wherein the first reserved supply amount is smaller than the first required amount, and ii) a second reserved supply amount of the energy source for the second vehicle. The second reserved supply amount is determined within a range where a total sum of the first reserved supply amount and the second reserved supply amount does not exceed the remaining amount.

13 Claims, 17 Drawing Sheets

(51) Int. Cl.
  *G05B 13/00* (2006.01)
  *G05B 15/00* (2006.01)
  *G05D 23/00* (2006.01)
  *F17C 5/06* (2006.01)
  *F17C 5/00* (2006.01)
  *B60K 15/03* (2006.01)

(52) U.S. Cl.
  CPC .............. *B60K 2015/03315* (2013.01); *F17C 2221/012* (2013.01); *F17C 2227/04* (2013.01); *F17C 2227/042* (2013.01); *F17C 2250/032* (2013.01); *F17C 2250/034* (2013.01); *F17C 2250/043* (2013.01); *F17C 2250/0417* (2013.01); *F17C 2250/0426* (2013.01); *F17C 2250/0473* (2013.01); *F17C 2250/0621* (2013.01); *F17C 2250/072* (2013.01); *F17C 2260/02* (2013.01); *F17C 2265/061* (2013.01); *F17C 2265/065* (2013.01); *F17C 2270/0139* (2013.01); *F17C 2270/0168* (2013.01); *Y02E 60/321* (2013.01)

(58) Field of Classification Search
  USPC .................................................. 700/275, 291
  See application file for complete search history.

(56) References Cited

U.S. PATENT DOCUMENTS

| | | | | |
|---|---|---|---|---|
| 2007/0144605 A1* | 6/2007 | Horowitz | ............... | G06Q 50/30 |
| | | | | 141/83 |
| 2012/0245750 A1* | 9/2012 | Paul | ..................... | G06Q 50/06 |
| | | | | 700/291 |
| 2014/0361745 A1* | 12/2014 | Nishita | .................. | G06Q 50/06 |
| | | | | 320/109 |

* cited by examiner

FIG. 4

| FIRST REMAINING STORED AMOUNT | VEHICLE IDENTIFICATION INFORMATION | ACCOUNT INFORMATION | VEHICLE STORED AMOUNT | REQUIRED AMOUNT | RESERVED SUPPLY AMOUNT |
|---|---|---|---|---|---|
| 220 L | VEHICLE A NUMBER: 12-34 | A01234 | 15 L | 100 L | 100 L |
| | VEHICLE B NUMBER: 56-78 | B56789 | 20 L | 150 L | 120 L |

FIG. 6

| FIRST REMAINING STORED AMOUNT | VEHICLE IDENTIFICATION INFORMATION | ACCOUNT INFORMATION | VEHICLE STORED AMOUNT | REQUIRED AMOUNT | RESERVED SUPPLY AMOUNT |
|---|---|---|---|---|---|
| 210 L | VEHICLE A NUMBER: 12-34 | A01234 | 15 L | 100 L | 100 L |
| | VEHICLE B NUMBER: 56-78 | B56789 | 20 L | 150 L | 96 L |

| FIRST REMAINING STORED AMOUNT | VEHICLE IDENTIFICATION INFORMATION | ACCOUNT INFORMATION | VEHICLE STORED AMOUNT | REQUIRED AMOUNT | RESERVED SUPPLY AMOUNT |
|---|---|---|---|---|---|
| 210 L | VEHICLE A NUMBER: 12-34 | A01234 | 15 L | 100 L | 90 L |
| | VEHICLE B NUMBER: 56-78 | B56789 | 20 L | 150 L | 120 L |

| FIRST REMAINING STORED AMOUNT | VEHICLE IDENTIFICATION INFORMATION | ACCOUNT INFORMATION | VEHICLE STORED AMOUNT | SHORTAGE TO FULL AMOUNT | REQUIRED AMOUNT | RESERVED SUPPLY AMOUNT |
|---|---|---|---|---|---|---|
| 210 L | VEHICLE A NUMBER: 12-34 | A01234 | 15 L | 100 L | 100 L | 70 L |
| | VEHICLE B NUMBER: 56-78 | B56789 | 20 L | 200 L | 150 L | 140 L |

FIG. 14

| CURRENT FIRST REMAINING STORED AMOUNT | VEHICLE IDENTIFICATION INFORMATION | VEHICLE ARRIVAL TIME | PREDICTED REMAINING AMOUNT OF ENERGY SOURCE | REQUIRED AMOUNT | RESERVED SUPPLY AMOUNT |
|---|---|---|---|---|---|
| 140 L | VEHICLE A | 10:00 | 150 L | 150 L | 100 L |
| | VEHICLE B | 12:00 | 200 L | 100 L | 100 L |

7e

CONTROL METHOD FOR ENERGY SOURCE SUPPLY SYSTEM THAT STORES AN ENERGY SOURCE AND SUPPLIES THE ENERGY SOURCE TO ONE OR MORE VEHICLES

BACKGROUND

1. Technical Field

The present disclosure relates to a control method for an energy source supply system and to the energy source supply system.

2. Description of the Related Art

Vehicles using hydrogen as fuel have been becoming widespread, in place of conventional vehicles using gasoline, natural gas, or the like as fuel. In accordance with the widespread use of vehicles using hydrogen, construction of hydrogen stations for hydrogen supply has progressed. In the present situations, however, the number of hydrogen stations installed is extremely smaller than the number of gas stations installed. Furthermore, hydrogen has a density lower than liquid fuel such as gasoline, and therefore, hydrogen stations have a low hydrogen storage capacity. Accordingly, there is a problem that it is not easy to reliably supply hydrogen when necessary while traveling of a vehicle.

As means for solving the above problem, an operation method for a reformer-installed hydrogen station which operates a reformer based on a request for hydrogen from a mobile body has been disclosed in Japanese Unexamined Patent Application Publication No. 2002-315111.

SUMMARY

The case where a plurality of vehicles require hydrogen at one hydrogen station is not sufficiently examined in the above related art.

One non-limiting and exemplary embodiment provides a control method for an energy source supply system, the control method being efficient for reducing the number of vehicles which cannot receive supply of hydrogen, for example, in the case where a plurality of vehicles require hydrogen at one hydrogen station.

In one general aspect, the techniques disclosed here feature a control method comprising: receiving from a first vehicle, first information including a first required amount of the energy source; receiving from a second vehicle, second information including a second required amount of the energy source; and determining, when a total sum of required amounts of the energy source received from two or more vehicles including the first vehicle and the second vehicle is larger than a remaining amount in a storage reservoir, i) a first reserved supply amount of the energy source for the first vehicle, wherein the first reserved supply amount is smaller than the first required amount, and ii) a second reserved supply amount of the energy source for the second vehicle. The second reserved supply amount is determined within a range where a total sum of the first reserved supply amount and the second reserved supply amount does not exceed the remaining amount.

According to the above aspect of the present disclosure, the number of vehicles that cannot receive supply of hydrogen may be reduced in the case where a plurality of vehicles require hydrogen at one hydrogen station.

It should be noted that general or specific embodiments may be implemented as a system, an integrated circuit, a computer program, a storage medium such as a computer-readable recording disk including a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a reservation management table according to the first embodiment;

FIG. 6 is a diagram illustrating another example of the reservation management table according to the first embodiment;

FIG. 14 is a diagram illustrating an example of an energy source remaining amount schedule according to the second embodiment;

DETAILED DESCRIPTION

Figure 1:
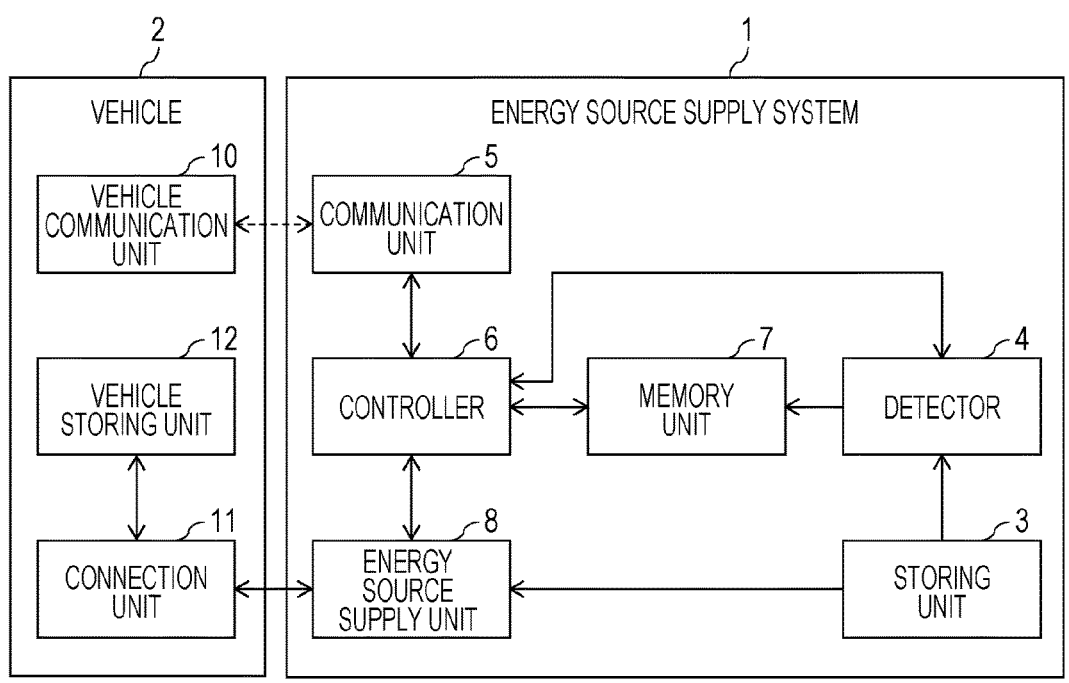
FIG. 1 is a block diagram illustrating a configuration of an energy source supply system according to a first embodiment.

The present inventors have found that problems described below occur in the operation method for the hydrogen station described in Japanese Unexamined Patent Application Publication No. 2002-315111 in the case where a plurality of vehicles require hydrogen.

Hydrogen storage capacity of storage reservoirs of the current hydrogen stations is so low that only several vehicles using hydrogen as fuel, such as fuel cell vehicles, are filled with hydrogen. Therefore, in the case where a plurality of vehicles requests a single hydrogen station for hydrogen, requests for hydrogen from all the vehicles may not be satisfied. In this case, some vehicles may not be supplied with hydrogen.

Furthermore, under the current circumstances, not only the hydrogen storage capacity of a hydrogen station is low, but the number of hydrogen stations installed is also small. Therefore, it is highly likely that hydrogen cannot be supplied to a vehicle which needs hydrogen.

In consideration of the current circumstances, the present inventors consider that stable continuous traveling of a vehicle using hydrogen as fuel may not be guaranteed.

From the above examination, the present inventor has conceived an aspect of the present disclosure described below.

According to an aspect of the present disclosure, a control method for an energy source supply system including a storage reservoir that stores an energy source, a supply device that supplies the energy source to one or more vehicles, and, a detector that detects a remaining amount of the energy source stored in the storage reservoir, the control method comprising:

receiving, from a first vehicle, first reservation information including i) first identification information identifying the first vehicle and ii) a first required amount of the energy source required by the first vehicle;

receiving, from a second vehicle, second reservation information including i) second identification information identifying the second vehicle and ii) a second required amount of the energy source required by the second vehicle;

acquiring, from the detector, a value indicating a first remaining amount, which is a remaining amount of the energy source stored in the storage reservoir;

determining, in a case where a total sum of required amounts of the energy source received from two or more vehicles including the first vehicle and the second vehicle is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being determined within a range where a total sum of the first reserved supply amount and the second reserved supply amount does not exceed the first remaining amount;

controlling, when the first vehicle is connected to the supply device, the supply device to supply to the first vehicle an amount of the energy source corresponding to the first reserved supply amount from the storage reservoir; and controlling, when the second vehicle is connected to the supply device, the supply device to supply to the second vehicle an amount of the energy source corresponding to the second reserved supply amount from the storage reservoir.

With this method, in the case where a reservation in which the energy source supply system is requested for the energy source is made by two or more vehicles, by determining an amount smaller than the first required amount as the amount of energy source to be supplied to the first vehicle, the number of vehicles that cannot receive supply of the energy source may be reduced. That is, the energy source stored in the storage reservoir of the energy source supply system may be distributed to the two or more vehicles.

In the control method for the energy source supply system, for example, in accordance with a ratio of the first required amount to the second required amount, the first reserved supply amount of the energy source and the second reserved supply amount of the energy source may be determined.

With this method, even in the case where the total sum of the required amounts from the two or more vehicles exceeds the first stored amount, the energy source stored in the storage reservoir may be distributed to the two or more vehicles in accordance with the ratio of the required amounts. That is, a larger amount of energy source can be supplied to a vehicle with a larger required amount, and therefore, the degree of requirement for the energy source may be reflected in the supply amount.

In the control method for the energy source supply system, for example, the first reservation information may further include information indicating a shortage to a first full amount of the energy source which can be supplied to a vehicle storage reservoir of the first vehicle, the second reservation information may further include information indicating a shortage to a second full amount of the energy source which can be supplied to a vehicle storage reservoir of the second vehicle, and in accordance with a ratio of the shortage to the first full amount to the shortage to the second full amount, the first reserved supply amount of the energy source and the second reserved supply amount of the energy source may be determined.

With this method, even in the case where the total sum of the required amounts from the two or more vehicles exceeds the stored amount in the energy source supply system, the energy source stored in the stored unit may be distributed to the two or more vehicles in accordance with the ratio of shortages to the full amounts of the energy source that can be supplied to the vehicle storage reservoirs. For example, in the case where the shortage to the first full amount is larger than the shortage to the second full amount, by supplying a larger amount of the energy source to the first vehicle than the second vehicle, the energy source may be distributed such that the ratio to the full amount of the first vehicle stored amount and the ratio to the full amount of the second vehicle stored amount may be equal to each other after the energy source is supplied.

In the control method for the energy source supply system, for example, in a case where the first reservation information and the second reservation information may be received within a predetermined period of time.

With this method, even in the case where the energy source supply system is requested for the energy source from two or more vehicles, the energy source may be supplied to more vehicles among vehicles which have made a reservation within the predetermined period of time. Furthermore, the supply amount of the energy source is determined based on the time at which the reservation is made, and therefore, schedule may be confirmed within the predetermined period of time.

In the control method for the energy source supply system, for example, the control method may comprise transmitting to the first vehicle information about asking a user of the first vehicle whether or not to accept an amount smaller than the first required amount as the first reserved supply amount for the first vehicle.

With this method, by notifying in advance the first vehicle that an amount of energy source smaller than the first required amount is to be supplied, a user of the first vehicle may be notified in advance that the first remaining amount stored in the energy source supply system is not sufficient for the required amount. Therefore, the user may be prevented from being unsatisfied with supply of an amount of energy source smaller than the required amount.

In the control method for the energy source supply system, for example, the energy source supply system may include a memory that registers first account information of a user of the first vehicle, the first reservation information may include the first account information, and the control method may comprise registering, in the memory, incentive information providing an incentive to the user of the first vehicle in association with the first account information.

With this method, supply of an amount of the energy source smaller than the required amount may be prompted. Therefore, the number of vehicles that cannot receive supply of the energy source may be reduced more reliably. Furthermore, a user may further be prevented from being unsatisfied with supply of an amount of the energy source smaller than the required amount, and repetitive use of the energy source supply system may be prompted.

In the control method for the energy source supply system, for example, the energy source supply system may include a memory that stores positional information about one or more different energy source supply systems which are different from the energy source supply system, and the control method may comprise transmitting to at least one of the first vehicle and the second vehicle, the positional information about any of the one or more different energy source supply systems.

With this method, in the case where the first remaining amount in the energy source supply system is not sufficient for the required amounts of the two or more vehicles, a vehicle requiring the energy source is prompted to be supplied with the energy source from a different energy source supply system, and concentration of vehicles on the energy source supply system is avoided. Therefore, the number of vehicles that cannot receive supply of the energy source may be reduced.

In the control method for the energy source supply system, for example, the first reservation information may further include first positional information indicating a position of the first vehicle at a time when the energy source is required at the first vehicle, the second reservation information may further include second positional information indicating a position of the second vehicle at a time when the energy source is required at the second vehicle, and at least one of i) transmitting to the first vehicle positional information of a first different energy source supply system closest to the position indicated by the first positional information among the one or more different energy source supply systems and ii) transmitting to the second vehicle positional information of a second different energy source supply system closest to the position indicated by the second positional information among the one or more different energy source supply systems, may be performed.

With this method, by transmitting positional information of an energy source supply system closest to the position of the vehicle at the time when the energy source is required at the vehicle among different energy source supply systems, a vehicle requiring the energy source may be prompted more reliably to be supplied with the energy source from the different energy source supply system.

In the control method for the energy source supply system, for example, the controlling method may comprise acquiring from one energy source supply system among the one or more different energy source supply systems, information indicating a second remaining amount, which is a remaining amount of the energy source stored in the one energy source supply system; and transmitting to at least one of the first vehicle and the second vehicle positional information of the one energy source supply system, in a case where the second remaining amount is larger than the first remaining amount.

With this method, by transmitting positional information of one energy source supply system with a second remaining amount larger than a first remaining amount among different energy source supply systems, a situation in which the energy source cannot be supplied due to a shortage of the energy source may be suppressed in the one energy source supply system. Therefore, a vehicle requiring the energy source may be prompted more reliably to be supplied with the energy source from the different energy source supply system.

In the control method for the energy source supply system, for example, the first reservation information may further include a first asking price for buying the energy source, the second reservation information may further include a second asking price for buying the energy source, and in accordance with a ratio of the first asking price to the second asking price, the first reserved supply amount of the energy source and the second reserved supply amount of the energy source may be determined.

With this method, in the case where the energy source supply system is requested for the energy source from two or more vehicles, by receiving a purchase asking price from each of the two or more vehicles, the amount of energy source to be supplied to the two or more vehicles may be determined in accordance with priority levels based on the asking price. Therefore, the degree of requirement for the energy source by a user of a vehicle may be reflected in the supply amount.

A control method for an energy source supply system including, a storage reservoir that stores an energy source, and a supply device that supplies the energy source to one or more vehicles, the control method comprising:

receiving, from a first vehicle, first reservation information including i) first identification information identifying the first vehicle, ii) a first required amount of the energy source required by the first vehicle, and iii) first positional information indicating a position of the first vehicle at a time when the energy source is required at the first vehicle;

receiving, from a second vehicle, second reservation information including i) second identification information identifying the second vehicle, ii) a second required amount of the energy source required by the second vehicle, and iii) second positional information indicating a position of the second vehicle at a time when the energy source is required at the second vehicle;

predicting a first arrival time of the first vehicle based on the first positional information;

predicting a second arrival time of the second vehicle based on the second positional information;

predicting, in a case where the second arrival time is latest among arrival times received from two or more vehicles including the first vehicle and the second vehicle, a remaining amount of the energy source stored in the storage reservoir at the second arrival time;

determining, in a case where a total sum of required amounts of the energy source received from the two or more vehicles including the first vehicle and the second vehicle is larger than the predicted remaining amount of energy source, i) a first reserved supply amount of the energy source which is to be supplied to the first vehicle, and ii) a second reserved supply amount of the energy source which is to be supplied to the second vehicle, wherein i) the first reserved supply amount is smaller than the first required amount and/or ii) the second reserved supply amount is smaller than the second required amount, wherein the second reserved supply amount is determined within a range where a total sum of the first reserved supply amount and the second reserved supply amount does not exceed a predicted remaining amount;

controlling, when the first vehicle is connected to the supply device, the supply device to supply to the first vehicle an amount of the energy source corresponding to the first reserved supply amount from the storage reservoir; and controlling, when the second vehicle is connected to the supply device, the supply device to supply to the second vehicle an amount of the energy source corresponding to the second reserved supply amount from the storage reservoir With this method, in the case where it is predicted that the remaining amount of the energy source at the arrival time of the second vehicle that reaches the energy source supply system at the latest time among the two or more vehicles is smaller than the total sum of the required amounts of the two or more vehicles, the number of vehicles that cannot receive supply of the energy source may be reduced more reliably.

In the control method for the energy source supply system, for example, a first effective period of the first reserved supply amount may be determined based on the first arrival time, a second effective period of the second reserved supply amount may be determined based on the second arrival time, and when the first vehicle is connected to the supply device within the first effective time, an amount of the energy source corresponding to the first reserved supply amount may be supplied to the first vehicle from the storage reservoir, and when the second vehicle is connected to the supply device within the second effective period, an amount of the energy source corresponding to the second reserved supply amount may be supplied to the second vehicle from the storage reservoir.

With this method, a user of a vehicle may be prompted to reach the energy source supply system within the effective time. That is, a possibility that the energy source is not supplied in spite of reservation due to no-arrival of the vehicle at the energy source supply system may be reduced, and a proper use of the energy source supply system may be prompted.

In the control method for the energy source supply system, for example, the energy source supply system may further include:

a generator that generates the energy source; and a detector that detects a remaining amount of the energy source stored in the storing reservoir, the control method may comprise:

acquiring from the detector a value indicating a first remaining amount, which is the remaining amount of the energy source stored in the storage reservoir at a time when the second arrival time is predicted; and predicting a remaining amount of the energy source stored in the storage reservoir at the second arrival time, based on the first remaining amount and a generation efficiency of the energy source at the generator.

With this method, in the energy source supply system including the generator that generates the energy source, the remaining amount of the energy source at the second arrival time may be predicted more accurately. Therefore, the number of vehicles that cannot receive supply of the energy source may be reduced more reliably.

In the control method for the energy source supply system, for example, the energy source supply system may include:

a memory that stores supply information including i) a supply time at which the energy source is supplied to the storage reservoir and ii) a supply amount of the energy source which is supplied to the storage reservoir at the supply time; and a detector that detects a remaining amount of the energy source stored in the storing reservoir, and the control method may comprise:

acquiring from the detector a value indicating a first remaining amount, which is a remaining amount of the energy source stored in the storage reservoir at a time when the second arrival time is predicted; and predicting, a remaining amount of the energy source stored in the storage reservoir at the second arrival time, based on the first remaining amount, the supply time, and the supply amount.

With this method, in the energy source supply system from which the energy source is externally supplied, the remaining amount of the energy source at the second arrival time may be predicted more accurately. Therefore, the number of vehicles that cannot receive supply of the energy source may be reduced more reliably.

According to an aspect of the present disclosure, an energy source supply system includes:

a storage reservoir unit that stores an energy source;

a supply device that supplies the energy source to one or more vehicles;

a communication circuitry that receive, from a first vehicle, first reservation information including i) first identification information identifying the first vehicle and ii) a first required amount of the energy source required by the first vehicle, and that receive, from a second vehicle, second reservation information including i) second identification information identifying the second vehicle and ii) a second required amount of the energy source required by the second vehicle;

a detector that detects a first remaining amount, which is a remaining amount of the energy source stored in the storage reservoir; and a controller, wherein the controller determines, in a case where a total sum of the first required amount and the second required amount is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being determined within a range where a total sum of the first reserved supply amount and the second reserved supply amount does not exceed the first remaining amount, controls, when the first vehicle is connected to the supply device, the supply device to supply to the first vehicle an amount of the energy source corresponding to the first reserved supply amount from the storage reservoir, and controls, when the second vehicle is connected to the supply device, the supply device to supply to the second vehicle an amount of the energy source corresponding to the second reserved supply amount from the storage reservoir With this configuration, in the case where the energy source supply system is requested for the energy source from two or more vehicles, by performing control such that an amount smaller than the first required amount is determined as the amount of the energy source to be supplied to the first vehicle, the number of vehicles that cannot receive supply of the energy source may be reduced. That is, the energy source stored in the storage reservoir of the energy source supply system may be distributed to the two or more vehicles.

A control method for an energy source supply system including a storage reservoir that stores an energy source, a supply device that supplies the energy source to one or more vehicles, and a detector that detects a remaining amount of the energy source stored in the storing reservoir, the control method comprising:

receiving, from a first vehicle, first reservation information including i) first identification information identifying the first vehicle and ii) a first required amount of the energy source required by the first vehicle;

receiving, from a second vehicle, second reservation information including i) second identification information identifying the second vehicle and ii) a second required amount of the energy source required by the second vehicle;

acquiring, from the detector, a value indicating a first remaining amount, which is a remaining amount of the energy source stored in the storage reservoir;

determining, in a case where a total sum of required amounts of the energy source received from two or more vehicles including the first vehicle and the second vehicle is larger than the first remaining amount, i) a first reserved supply amount of the energy source which is to be supplied to the first vehicle and ii) a second reserved supply amount of the energy source which is to be supplied to the second vehicle, in accordance with a ratio of the first required amount to the second required amount;

controlling, when the first vehicle is connected to the supply device, the supply device to supply to the first vehicle an amount of the energy source corresponding to the first reserved supply amount from the storage reservoir; and controlling, when the second vehicle is connected to the supply device, the supply device to supply to the second vehicle an amount of the energy source corresponding to the second reserved supply amount from the storage reservoir.

With this method, even in the case where the total sum of the required amounts from the two or more vehicles exceeds the first remaining amount, the energy source stored in the storage reservoir may be distributed to the two or more vehicles in accordance with the ratio of the required amounts. That is, a larger amount of the energy source can be supplied to a vehicle with a larger required amount, and therefore, the degree of requirement for the energy source may be reflected in the supply amount.

A control method for an energy source supply system including a storage reservoir that stores an energy source, a supply device that supplies the energy source to one or more vehicles, and a detector that detects a remaining amount of the energy source stored in the storing reservoir, the control method comprising:

receiving, from a first vehicle, first reservation information including i) first identification information identifying the first vehicle, ii) a first required amount of the energy source required by the first vehicle, and iii) information indicating a shortage to a first full amount of the energy source which can be supplied to a vehicle storage reservoir of the first vehicle;

receiving, from a second vehicle, second reservation information including i) second identification information identifying the second vehicle, ii) a second required amount of the energy source required by the second vehicle, and iii) information indicating a shortage to a second full amount of the energy source which can be supplied to a vehicle storage reservoir of the second vehicle;

acquiring, from the detector, a value indicating a first remaining amount, which is a remaining amount of the energy source stored in the storage reservoir;

determining, in a case where a total sum of required amounts of the energy source received from two or more vehicles including the first vehicle and the second vehicle is larger than the first remaining amount, i) a first reserved supply amount of the energy source which is to be supplied to the first vehicle and ii) a second reserved supply amount of the energy source which is to be supplied to the second vehicle, in accordance with a ratio of the shortage to the first full amount to the shortage to the second full amount; and controlling, when the first vehicle is connected to the supply device, the supply device to supply to the first vehicle an amount of the energy source corresponding to the first reserved supply amount from the storage reservoir; and controlling, when the second vehicle is connected to the supply device, the supply device to supply to the second vehicle an amount of the energy source corresponding to the second reserved supply amount from the storage reservoir.

With this method, even in the case where the total sum of the required amounts from the two or more vehicles exceeds the stored amount in the energy source supply system, the energy source stored in the stored unit may be distributed to the two or more vehicles in accordance with the ratio of shortages to the full amounts of energy source that can be supplied to the vehicle storage reservoirs. For example, in the case where the shortage to the first full amount is larger than the shortage to the second full amount, by supplying a larger amount of energy source to the first vehicle than the second vehicle, the energy source may be distributed such that the ratio to the full amount of the first vehicle stored amount and the ratio to the full amount of the second vehicle stored amount may be equal to each other after the energy source is supplied.

Hereinafter, embodiments will be specifically described with reference to drawings.

The embodiments described below represent general or specific examples. The numerical values, shapes, materials, component elements, arrangement and connection state of the component elements, steps, processing order of the steps, and the like illustrated in the embodiments described below are merely examples, and are not intended to limit the scope of the Claims. Furthermore, among the component elements in the embodiments described below, component elements not described in any one of the independent claims representing top concepts are described as arbitrary component elements.

Furthermore, each drawing is a schematic diagram and is not necessarily illustrated strictly. Furthermore, in each drawing, substantially the same elements are referred to with the same reference signs, and redundant explanations may be omitted or simplified.

First Embodiment

[Configuration of Energy Source Supply System]

FIG. 1 is a block diagram illustrating a configuration of an energy source supply system 1 according to a first embodiment. The energy source supply system 1 is a system which supplies an energy source to a vehicle 2. Energy sources represent, for example, hydrogen fuel such as hydrogen gas or liquid hydrogen, hydrocarbon-based fuel such as gasoline, light oil, or natural gas, electricity, and the like. That is, the energy source supply system 1 may be illustrated as a hydrogen station, a gas station, an electric vehicle charging station, or the like. An energy source may be energy for driving a power source of a vehicle, and is not limited to the above example. The energy source supply system 1 includes a storage reservoir 3, a detector 4, a communication unit 5, a controller 6, a memory 7, and an energy source supply device 8.

The storage reservoir 3 stores an energy source. The storage reservoir 3 is a storing unit, for example, a container such as an air-tight storage tank in which gas or liquid may be stored, a storage battery, or the like.

The detector 4 detects a remaining amount, which is the amount of the energy source stored in the storage reservoir 3, that is, the remaining amount of the energy source. The detector 4 is, for example, a weight sensor detecting the weight of the storage reservoir 3, a pressure sensor attached inside the storage reservoir 3, a battery remaining amount measuring unit, or the like. For example, in the case where the detector 4 is a pressure sensor, the detector 4 detects the amount of energy source stored in the storage reservoir 3, based on variations in the pressure inside the storage reservoir 3.

The communication unit 5 performs communication, specifically, wireless communication, with a vehicle communication unit 10 of the vehicle 2, and receives vehicle identification information of the vehicle 2 and requirement information including a required amount, which is the amount of request from the vehicle 2 for supply of the energy source. The communication unit 5 may be, for example, a communication adaptor for wireless communication. The vehicle communication unit 10 may be, for example, a car navigation system, an ETC-equipped vehicle, or the like. The vehicle communication unit 10 may communicate with the communication unit 5 via a communication terminal such as a mobile phone, a smartphone, a tablet terminal, and the like.

Before supplying the energy source to the vehicle 2, the controller 6 determines the reserved supply amount of energy source, which is the amount of energy source scheduled to be supplied to the vehicle 2 from the energy source supply system 1, based on information received from the vehicle 2. The controller 6 stores acquired vehicle identification information and the determined reserved supply amount of energy source, in association with each other, into the memory 7.

The memory 7 is a memory unit, for example, a semiconductor memory, a hard disk drive, or the like, and stores data and information. The memory 7 stores vehicle identification information and the reserved supply amount determined by the controller 6, in association with each other. Furthermore, the memory 7 stores the remaining amount of energy source in the storage reservoir 3 detected by the detector 4.

The energy source supply device 8 is an energy source supply unit configured to be connected to a connection unit 11 of the vehicle 2. When being connected to the connection unit 11, the energy source supply unit 8 supplies an energy source to a vehicle storage reservoir 12 of the vehicle 2 via the connection unit 11 from the storage reservoir 3. The energy source supply unit 8 may be, for example, a dispenser. The connection unit 11 is illustrated as, for example, a filling port for an energy source, a valve of the vehicle storage reservoir 12 storing an energy source in the vehicle 2, or the like.

Furthermore, the controller 6 is configured to be able to receive vehicle identification information of the vehicle 2 from the vehicle 2 when the energy source supply device 8 is connected to the connection unit 11. For example, the controller 6 receives vehicle identification information of the vehicle 2 via the energy source supply device 8 from the connection unit 11 of the vehicle 2. In the case where vehicle identification information is associated with an owner, a passenger, or the like of a vehicle, the controller 6 may receive information of the owner, passenger, or the like of the vehicle. Furthermore, the controller 6 controls, based on information of the correspondence between the vehicle identification information and a reserved supply amount stored in the memory 7, the energy source supply device 8 to supply the reserved supply amount of energy source corresponding to the vehicle 2 to the vehicle 2. Reception of vehicle identification information of the vehicle 2 by the controller 6 is not limited to the above configuration. For example, the controller 6 may receive vehicle identification information of the vehicle 2 by input of information, such as an ID associated with the vehicle identification information, a reservation number for a determined reserved supply amount, or the like, to the energy source supply unit 8 or a peripheral device by a passenger of the vehicle 2. Such input of the above information may be implemented using any of methods performed by a passenger of the vehicle 2, including manual input of the above information, reception of biometrics authentication, communication using a wireless communication terminal such as a portable terminal or a wired communication terminal, insertion of a magnetic card for identification, and bringing a contactless IC chip closer to the energy source supply unit 8 or a peripheral device.

The controller 6 may be implemented by any unit including a control function. For example, the controller 6 may be dedicated hardware. Furthermore, for example, the controller 6 may be implemented by executing a software program suitable for each component element. In this case, the controller 6 may include, for example, an arithmetic processing unit (not illustrated in FIG. 1) and a memory (not illustrated in FIG. 1) which stores a control program. A micro processing unit (MPU), a central processing unit (CPU), or the like is illustrated as the arithmetic processing unit. The memory or the like is illustrated as a memory. The controller 6 may be a single controller that performs intensive control or may include a plurality of controllers that perform distribution control in cooperation with one another.

[Energy Source Supply Method]

Figure 2:
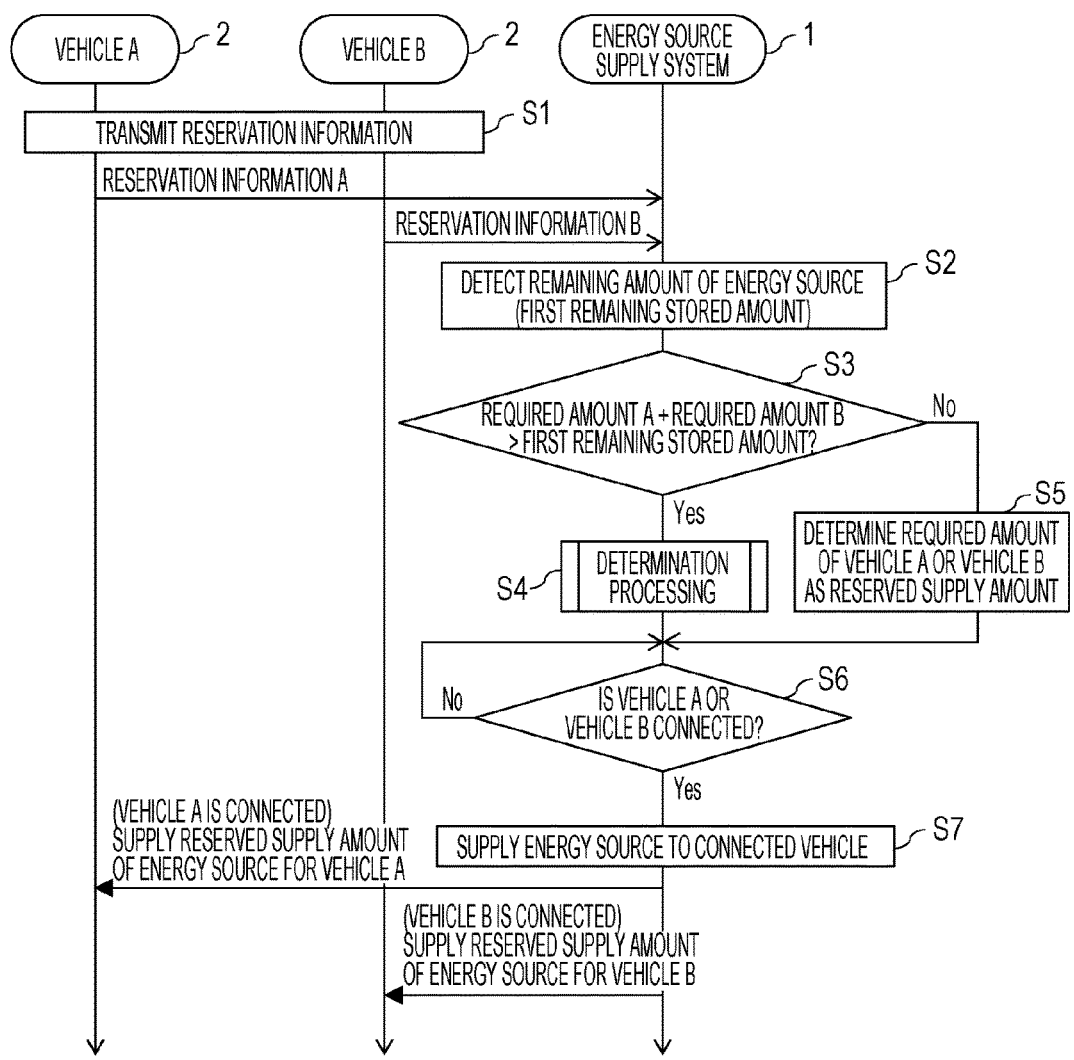
FIG. 2 is a diagram illustrating an energy source supply method according to the first embodiment.

FIG. 2 is a diagram illustrating an energy source supply method according to the first embodiment. A supply method used when the vehicle 2 receives supply of an energy source by using the energy source supply system 1 will be described below for a case where two or more vehicles 2, that is, a vehicle A and a vehicle B, receive supply of the energy source.

First, the vehicle A and the vehicle B which require an energy source to be supplied transmit reservation information to the energy source supply system 1 (S1). For example, before reaching the energy source supply system 1, the vehicle A and the vehicle B transmit the reservation information. Specifically, the reservation information is transmitted from the vehicle communication unit 10 of each of the vehicle A and the vehicle B to the communication unit 5 of the energy source supply system 1. The reservation information includes, for example, vehicle identification information for identifying each of the vehicle A and the vehicle B. Furthermore, the reservation information includes the type of energy source required by each of the vehicle A and the vehicle B and the supply amount, that is, the required amount of required energy source. Moreover, the reservation information may include, for example, a vehicle stored amount, which is the amount of energy source stored in the vehicle storage reservoir 12 of each of the vehicle A and the vehicle B, and account information, which will be described later, of each of the vehicle A and the vehicle B. The required amount may be the shortage to the amount of energy source that fills up the vehicle storage reservoir 12, the shortage being calculated based on the vehicle remaining amount of energy source or may be an amount set below or equal to the shortage in a desired manner. The calculation of the shortage may be performed by a device of the vehicle or an element such as the controller 6 of the energy source supply system 1.

When receiving the reservation information from the vehicle communication unit 10 of each of the vehicle A and the vehicle B, the controller 6 detects the remaining amount of energy source stored in the storage reservoir 3 of the energy source supply system 1 (S2). Specifically, the controller 6 causes the detector 4 to detect the remaining amount of energy source stored in the storage reservoir 3, and causes the memory 7 to store the detected remaining amount of energy source. The detection of the remaining amount of energy source may be performed at a desired point in time before or after reception of the reservation information from the vehicle A and the vehicle B.

Next, the controller 6 compares the total sum of required amounts received from the vehicle A and the vehicle B with the remaining amount of energy source stored in the storage reservoir 3, that is, a first remaining amount (S3). In the case where the total sum of required amounts received from the vehicle A and the vehicle B is larger than the first remaining amount (Yes in S3), the controller 6 determines an amount smaller than the required amount of the vehicle A or the required amount of the vehicle B as a reserved supply amount of the corresponding vehicle (determination processing in S4). In this processing, the controller 6 creates a reservation management table. Then, the controller 6 causes the memory 7 to store the reserved supply amount. In the case where the total sum of the required amount received from the vehicle A and the required amount received from the vehicle B is smaller than or equal to the first remaining amount (No in S3), the controller 6 determines a required amount A as a reserved supply amount A of the vehicle A and determines a required amount B as a reserved supply amount B of the vehicle B (S5). In the case where the controller 6 may identify the time at which the vehicle A and the vehicle B reach the energy source supply system 1 or the positions of the vehicle A and the vehicle B, the determination of the reserved supply amounts of the vehicle A and the vehicle B is desirably completed before the vehicle A and the vehicle B reach the energy source supply system 1.

The determination processing (S4) and an example of the reservation management table will be described below with reference to FIGS. 3 and 4.

Figure 3:
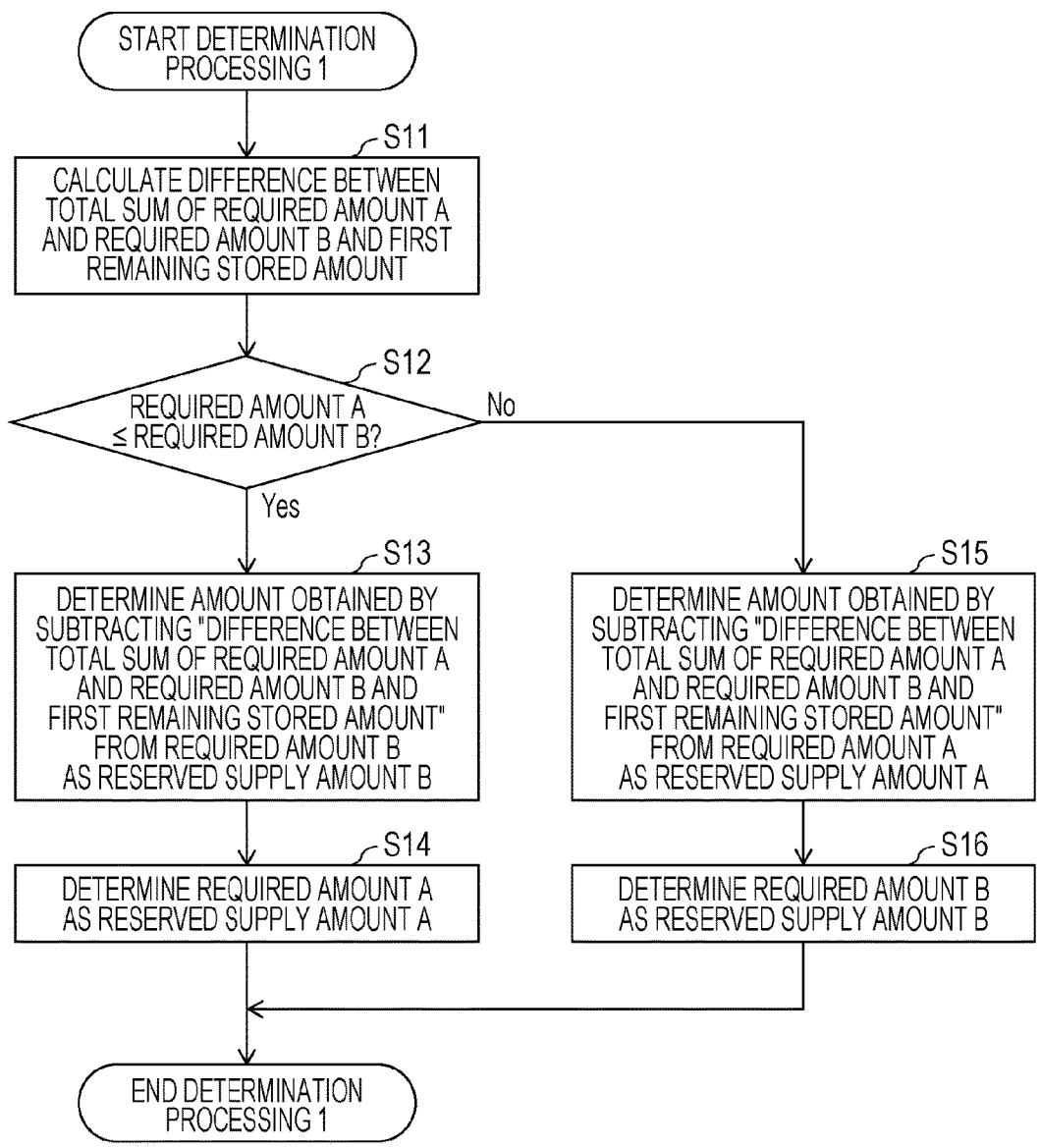
FIG. 3 is a diagram illustrating an example of determination processing of the energy source supply method according to the first embodiment.

FIG. 3 is a diagram illustrating an example of determination processing of the energy source supply method according to the first embodiment.

In determination processing 1 illustrated in FIG. 3, first, the controller 6 calculates the difference between the total sum of the required amount A and the required amount B and the first remaining amount (S11). Next, the controller 6 compares the required amount A with the required amount B (S12). In the case where the required amount B is equal to or larger than the required amount A (Yes in S12), the controller 6 determines an amount obtained by subtracting the difference between the total sum of the required amount A and the required amount B and the first remaining amount from the required amount B as the reserved supply amount B (S13). The controller 6 also determines the required amount A as the reserved supply amount A (S14). In contrast, in the case where the required amount B is smaller than the required amount A (No in S12), the controller 6 determines an amount obtained by subtracting the difference between the total sum of the required amount A and the required amount B and the first remaining amount from the required amount A as the reserved supply amount A (S15). The controller 6 also determines the required amount B as the reserved supply amount B (S16). By the above determination processing 1, an amount smaller than the required amount of the vehicle A or the required amount of the vehicle B may be determined as the reserved supply amount of the corresponding vehicle.

FIG. 4 is a diagram illustrating an example of the reservation management table according to the first embodiment.

A reservation management table 7a includes, as illustrated in FIG. 4, fields for a first remaining amount of the energy source supply system, vehicle identification information, account information, a vehicle stored amount, a required amount, and a reserved supply amount.

In the field for the first remaining amount of the energy source supply system, the remaining amount of energy source stored in the storage reservoir 3 of the energy source supply system 1, which is detected by the detector 4, is registered.

In the field for the vehicle identification information, information which may identify the vehicle A and the vehicle B, including a registration number or vehicle body number of each of the vehicle A and the vehicle B, an identification number unique to the vehicle communication unit 10 of each of the vehicle A and the vehicle B, and the like, may be registered as vehicle identification information.

In the field for the account information, account information including a member ID used for using a service of the energy source supply system 1 is registered in association with the vehicle identification information. The account information is registered in the case where account information is included in the reservation information transmitted from the vehicle A and the vehicle B. The account information may include other types of information associated with a member ID, such as information of the number of points held by a member for payment for the energy source supply system 1, points which may be used for other services, and the like.

In the field for the vehicle stored amount, a vehicle stored amount, which is the amount of energy source stored in the vehicle storage reservoir 12 of each of the vehicle A and the vehicle B, is registered in association with the vehicle identification information. The vehicle stored amount is registered in the case where vehicle stored amount information is included in the reservation information transmitted from the vehicle A and the vehicle B. The vehicle stored amount is represented by the volume, weight, pressure, or the like of energy source. In FIG. 4, an example in which a vehicle stored amount is represented by volume is illustrated.

In the field for the required amount, a required amount, which is the supply amount of energy source required by each of the vehicle A and the vehicle B, is registered in association with the vehicle identification information. The required amount is represented by the volume, weight, pressure, or the like of energy source. In FIG. 4, an example in which the required amount is represented by volume is illustrated.

In the field for the reserved supply amount, a reserved supply amount, which is the amount of energy source scheduled to be supplied to each of the vehicle A and the vehicle B, the reserved supply amount being determined by the controller 6, is registered in association with the vehicle identification information. In FIG. 4, an example of a reserved supply amount determined by the determination processing 1 illustrated in FIG. 3 is illustrated. First, 30 liters, which is the difference between 250 liters, which is the total sum of 100 liters, which is the required amount A, and 150 liters, which is the required amount B, and 220 liters, which is the first stored amount, is calculated. Then, the calculated 30 liters is subtracted from 150 liters, which is the required amount B, and obtained 120 liters is determined as the reserved supply amount B. Furthermore, 100 liters, which is the required amount A, is determined as the reserved supply amount A.

In addition to the above fields, arrival time information of time at which each of the vehicle A and the vehicle B reaches the energy source supply system 1, positional information of each of the vehicle A and the vehicle, or the like may be registered in the reservation management table 7a.

Next, when detecting that the vehicle A or the vehicle B has reached the energy source supply system 1 and the connection unit 11 of the vehicle A or the vehicle B has been connected to the energy source supply unit 8 of the energy source supply system 1 (Yes in S6), the controller 6 supplies the energy source to the connected vehicle A or vehicle B (S7). Specifically, in the first embodiment, when the connection unit 11 of a vehicle is connected to the energy source supply unit 8, the controller 6 receives vehicle identification information of the connected vehicle via the energy source supply unit 8 from the connection unit 11. The controller 6 refers to the reservation management table 7a of the memory 7, and controls the energy source supply unit 8 to supply the energy source to the connected vehicle. That is, in accordance with the received vehicle identification information in the reservation management table 7a, the reserved supply amount of energy source determined in advance is supplied to the connected vehicle.

As described above, with the energy source supply method according to the first embodiment, even when the energy source supply system 1 is requested for supply of an energy source from two or more vehicles, by reducing the amount of energy source to be supplied to at least one vehicle, all the vehicles may be supplied with the energy source. Therefore, the number of vehicles that receive no energy source supply may be suppressed.

In the first embodiment, an amount of energy source smaller than the required amount of the vehicle A or the required amount of the vehicle B is determined as the reserved supply amount of the corresponding vehicle. However, an amount of energy source which is smaller than each of the required amount of the vehicle A and the required amount of the vehicle B may be determined as the reserved supply amount of each of the vehicle A and the vehicle B. That is, an amount of energy source which is smaller than the required amount of each vehicle requiring supply of an energy source may be determined as the reserved supply amount of the corresponding vehicle. With this method, even when the energy source supply system 1 is requested for an energy source from two or more vehicles, by reducing the amount of energy source to be supplied to all the vehicles, the energy source may be supplied to all the vehicles. In this case, by not supplying an amount of energy source smaller than a required supply amount to only one vehicle but reducing the amount of energy source to be supplied to all the vehicles requiring supply of the energy source, concentration of load on a single vehicle may be suppressed, and therefore, supply amounts of energy source may be allocated to all the vehicles with uniform reduction burden.

Another example of the determination processing (S4) and the reservation management table will be described with reference to FIGS. 5 to 10.

First, determination processing 2 for determining the reserved supply amount of each of the vehicle A and the vehicle B in accordance with the magnitude relationship between the required amount A and the required amount B will be described with reference to FIGS. 5 and 6.

Figure 5:
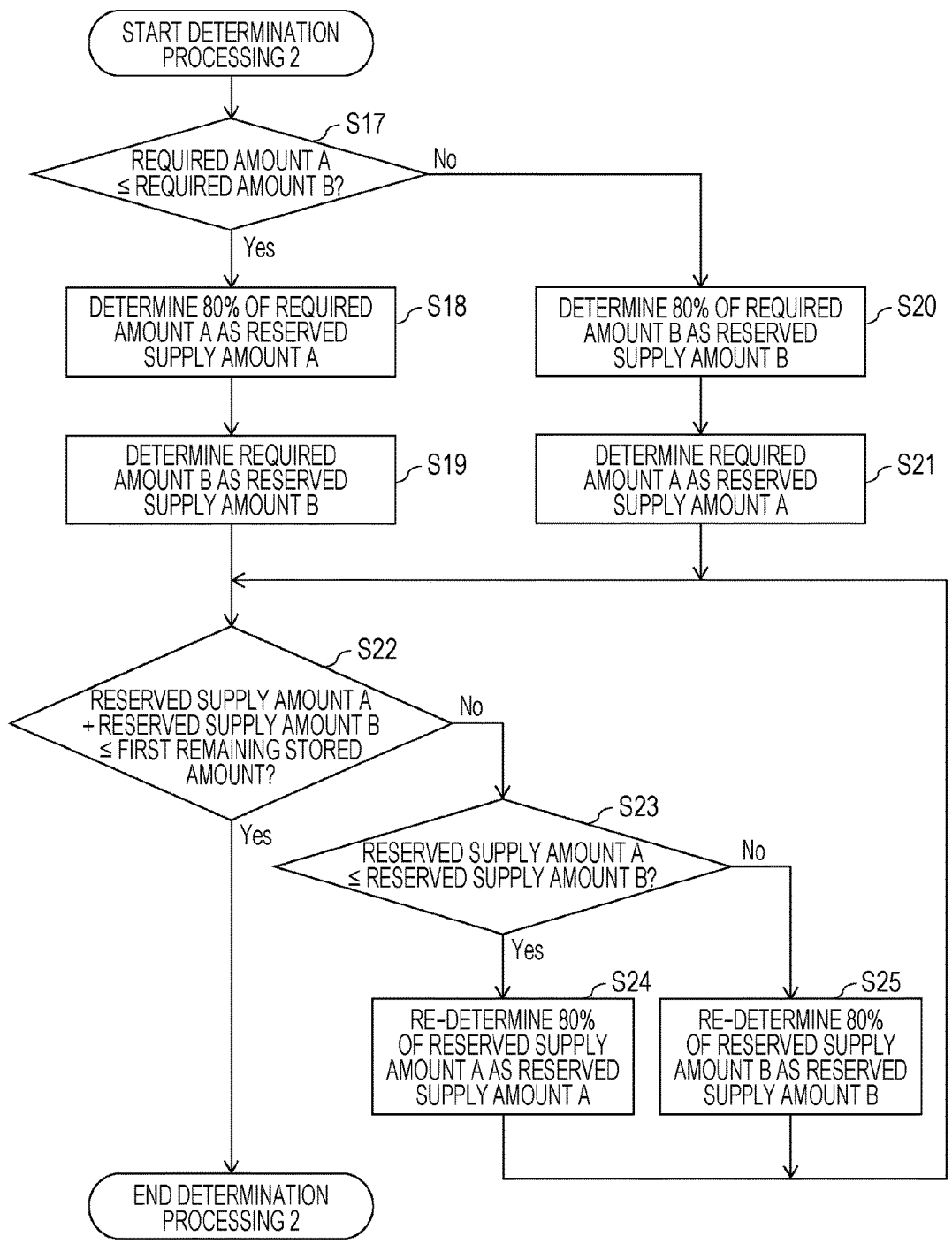
FIG. 5 is a diagram illustrating another example of the determination processing of the energy source supply method according to the first embodiment.

FIG. 5 is a diagram illustrating another example of the determination processing of the energy source supply method according to the first embodiment.

In the determination processing 2 in FIG. 5, first, the controller 6 compares the required amount A received from the vehicle A with the required amount B received from the vehicle B (S17). In the case where the required amount B is equal to or larger than the required amount A (Yes in S17), 80% of the required amount A is determined as the reserved supply amount A (S18). Furthermore, the required amount B is determined as the reserved supply amount B (S19). In contrast, in the case where the required amount B is smaller than the required amount A (No in S17), 80% of the required amount B is determined as the reserved supply amount B (S20). Furthermore, the required amount A is determined as the reserved supply amount A (S21).

Next, the total sum of the reserved supply amount A and the reserved supply amount B is compared with the first remaining amount (S22). In the case where the total sum of the reserved supply amount A and the reserved supply amount B is smaller than or equal to the first remaining amount (Yes in S22), the determination processing 2 ends. In contrast, in the case where the total sum of the reserved supply amount A and the reserved supply amount B is larger than the first remaining amount (No in S22), the reserved supply amount A is compared with the reserved supply amount B (S23). In the case where the reserved supply amount A is smaller than or equal to the reserved supply amount B (Yes in S23), 80% of the reserved supply amount A is re-determined as the reserved supply amount A (S24).

After re-determination of the reserved supply amount A, the total sum of the reserved supply amount A and the reserved supply amount B is compared with the first remaining amount (S22). In contrast, in the case where the reserved supply amount A is larger than the reserved supply amount B (No in S23), 80% of the reserved supply amount B is re-determined as the reserved supply amount B (S25). After the re-determination of the reserved supply amount B, the total sum of the reserved supply amount A and the reserved supply amount B is compared with the first remaining amount (S22).

FIG. 6 illustrates a reservation management table 7b used in the determination processing 2. The reservation management table 7b is different from the reservation management table 7a in that the reserved supply amount determined in the determination processing 2 is registered in the field for the reserved supply amount. The other fields are similar to those illustrated in FIG. 4, and therefore, explanation for those similar fields will be omitted. As the reserved supply amount in the reservation management table 7b, the reserved supply amount determined in the determination processing 2 is registered. In FIG. 6, an example in which 100 liters, which is the required amount A, is compared with 150 liters, which is the required amount B, and an amount smaller than the required amount B is determined as the reserved supply amount B is illustrated.

Next, determination processing 3 for determining the reserved supply amount of each of the vehicle A and the vehicle B in accordance with the ratio of the required amount A to the required amount B will be described with reference to FIGS. 7 and 8.

Figures 7, 8:
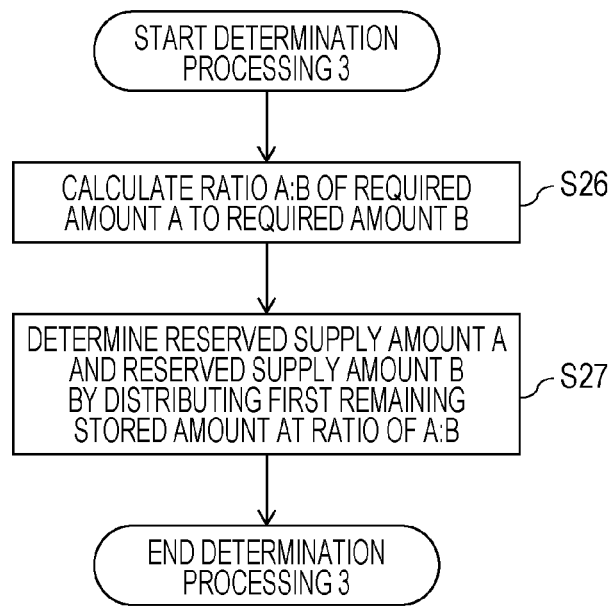
FIG. 7 is a diagram illustrating another example of the determination processing of the energy source supply method according to the first embodiment.
FIG. 8 is a diagram illustrating another example of the reservation management table according to the first embodiment.

FIG. 7 is a diagram illustrating another example of the determination processing of the energy source supply method according to the first embodiment.

In the determination processing 3 illustrated in FIG. 7, first, the controller 6 compares the ratio of the required amount A received from the vehicle A to the required amount B received from the vehicle B (S26). Next, the first remaining amount to be distributed to the reserved supply amount A and the reserved supply amount B is determined in accordance with the calculated ratio of the required amount A to the required amount B (S27). At this time, the ratio of the required amount A to the required amount B may not be strictly calculated. For example, the magnitude relationship between the required amount A and the required amount B may be simply obtained. In this case, the reserved supply amount may be determined such that the reserved supply amount of a vehicle with a larger required amount is larger than the reserved supply amount of the other vehicle.

FIG. 8 illustrates a reservation management table 7c used in the determination processing 3. The reservation management table 7c is different from the reservation management table 7a and the reservation management table 7b in that the reserved supply amount determined in the determination processing 3 is registered in the field for the reserved supply amount. The other fields are similar to those illustrated in FIG. 4 and FIG. 6, and therefore, explanation for those similar fields will be omitted. The reserved supply amount in the reservation management table 7c is determined in accordance with the ratio of the required amount of the vehicle A to the required amount of the vehicle B, as described in the determination processing 3. In this case, the ratio of the required amount A to the required amount B is 2:3. That is, in the case where the first remaining amount is 210 liters, 210 liters is distributed at a ratio of 2:3. 90 Liters is determined as the reserved supply amount A of the vehicle A, and 120 liters is determined as the reserved supply amount B of the vehicle B. The determined reserved supply amount A and reserved supply amount B are registered in association with the vehicle identification information.

With the determination processing 3, a larger reserved supply amount is set for a vehicle with a relatively large required amount among two or more vehicles requiring an energy source, and a smaller reserved supply amount is set for a vehicle with a relatively small required amount. That is, the degree of requirement for a relatively large required amount of energy source may be reflected in the supply amount.

Next, determination processing 4 for determining the reserved supply amount of each of the vehicle A and the vehicle B in accordance with the ratio of the shortage to the amount of energy source that fills up the vehicle A to the shortage to the amount of energy source that fills up the vehicle B will be described with reference to FIGS. 9 and 10.

Figures 9, 10:
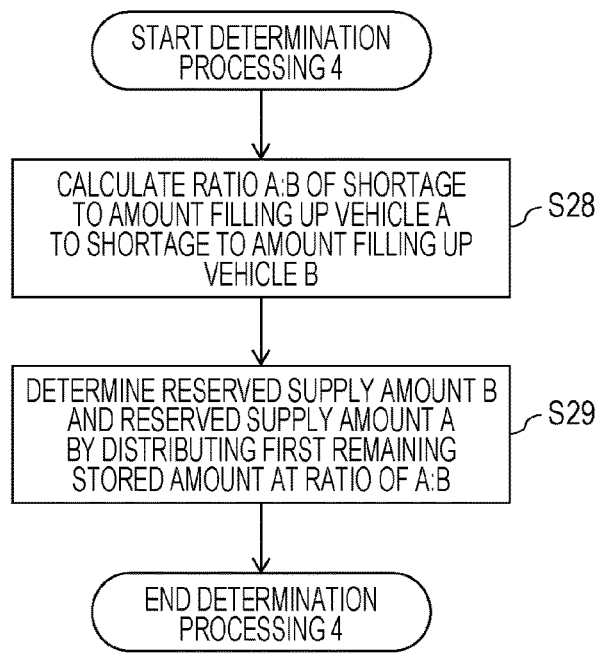
FIG. 9 is a diagram illustrating another example of the determination processing of the energy source supply method according to the first embodiment.
FIG. 10 is a diagram illustrating another example of the reservation management table according to the first embodiment.

FIG. 9 illustrates another example of the determination processing in the energy source supply method according to the first embodiment.

In the determination processing 4 illustrated in FIG. 9, first, the controller 6 calculates the ratio of the shortage to the amount of energy source that fills up the vehicle A to the shortage to the amount of energy source that fills up the vehicle B (S28). Next, the reserved supply amount B and the reserved supply amount A are determined by distributing the first remaining amount to the reserved supply amount B and the reserved supply amount A in accordance with the calculated ratio of the shortage to the amount of energy source that fills up the vehicle A to the shortage to the amount of energy source that fills up the vehicle B (S29). At this time, the ratio of the shortage to the amount of energy source that fills up the vehicle A to the shortage to the amount of energy source that fills up the vehicle B may not be strictly calculated. For example, only the magnitude relationship between the shortage to the amount of energy source that fills up the vehicle A to the shortage to the amount of energy source that fills up the vehicle B may be obtained. The reserved supply amounts may be determined such that the reserved supply amount of a vehicle with a larger shortage to the amount of energy source that fills up the vehicle is smaller than the reserved supply amount of the other vehicle.

FIG. 10 illustrates a reservation management table 7d used in the determination processing 4. The reservation management table 7d is different from the reservation management table 7a, the reservation management table 7b, and the reservation management table 7c in that the reserved supply amount determined in the determination processing 4 is registered in the field for the reserved supply amount. The other fields are similar to those illustrated in FIGS. 4, 6, and 8, and therefore, explanation for those similar fields will be omitted. The reserved supply amount in the reservation management table 7d is determined in accordance with the ratio of the vehicle stored amount of the vehicle A to the vehicle stored amount of the vehicle B, as described in the determination processing 4. In this case, the ratio of the shortage to the amount of energy source that fills up the vehicle A to the shortage to the amount of energy source that fills up the vehicle B is 1:2. That is, in the case where the first remaining amount is 210 liters, 210 liters is distributed at a ratio of 1:2. 70 liters is determined as the reserved supply amount A of the vehicle A, 140 liters is determined as the reserved supply amount B of the vehicle B. The determined reserved supply amount A and reserved supply amount B are registered in association with the vehicle identification information.

With the determination processing 4, a necessary amount of energy source may be supplied to two or more vehicles requiring an energy source, in accordance with the remaining amount of energy source held by the vehicles at a time when reservation information is transmitted. By setting a smaller supply amount of energy source for a vehicle with a relatively large remaining amount of energy source among two or more vehicles requiring the energy source and setting a larger supply amount of energy source for a vehicle with a relatively small remaining amount of energy source, the amounts of energy source held by the vehicles after supply of the energy source may be more equal among the vehicles.

Furthermore, reservation time at which reservation information is received from two or more vehicles may be detected. In the case where reservation information is received from two or more vehicles within a predetermined period time, an amount smaller than a required amount received from at least one of the two or more vehicles may be determined as the reserved supply amount of the corresponding vehicle. That is, according to the first embodiment, in the case where the energy source supply system 1 receives reservation information from the vehicle A and the vehicle B within a predetermined period of time, an amount smaller than a required amount of at least one of the vehicle A and the vehicle B may be determined as the reserved supply amount of the corresponding vehicle.

In this case, the energy source supply system 1 may include a time measurement unit (not illustrated in FIG. 1). For example, when receiving reservation information from the vehicle A, the controller 6 controls the time measurement unit to detect the time at which the reservation information was received. Next, the controller 6 controls the time measurement unit to start counting the elapsed time since reception of the reservation information of the vehicle A. In the case where reservation information of the vehicle B is received before a predetermined time has passed since the reception of the reservation information of the vehicle A, the controller 6 determines that a plurality of vehicles transmitted reservation information within the predetermined period of time. Then, the controller 6 compares the total sum of the required amounts received from the vehicle A and the vehicle B with the first remaining amount stored in the storage reservoir 3 (S3). Subsequent control may be performed in a manner similar to that described above in the first embodiment.

With this method, a situation in which energy source cannot be supplied to a vehicle transmitting reservation information within a predetermined period of time may be suppressed, irrespective of the arrival time of the vehicle. That is, a problem that a large amount of energy source is supplied only to a vehicle reaching the energy source supply system 1 earlier and no energy source is supplied to a vehicle reaching the energy source supply system 1 later may be suppressed. Furthermore, by controlling the reserved supply amount of two or more vehicles from which reservation information is received within a predetermined period of time, the reserved supply amount may be determined within a predetermined period of time since reception of the reservation information, and therefore, reservation may be confirmed quickly.

<Modifications>

Furthermore, as a modification of the first embodiment, information about asking whether or not to permit determining an amount of energy source smaller than a required amount may be transmitted to the vehicle communication unit 10 of at least one vehicle among the vehicle communication units 10 of a plurality of vehicles requiring supply of the energy source. In this case, when receiving permission information via the communication unit 5 from the vehicle communication unit 10 which has transmitted the information, the controller 6 may determine a supply amount of energy source smaller than the required amount as the reserved supply amount of the corresponding vehicle. A specific flow of the above processing will be described below with reference to FIG. 11.

Figure 11:
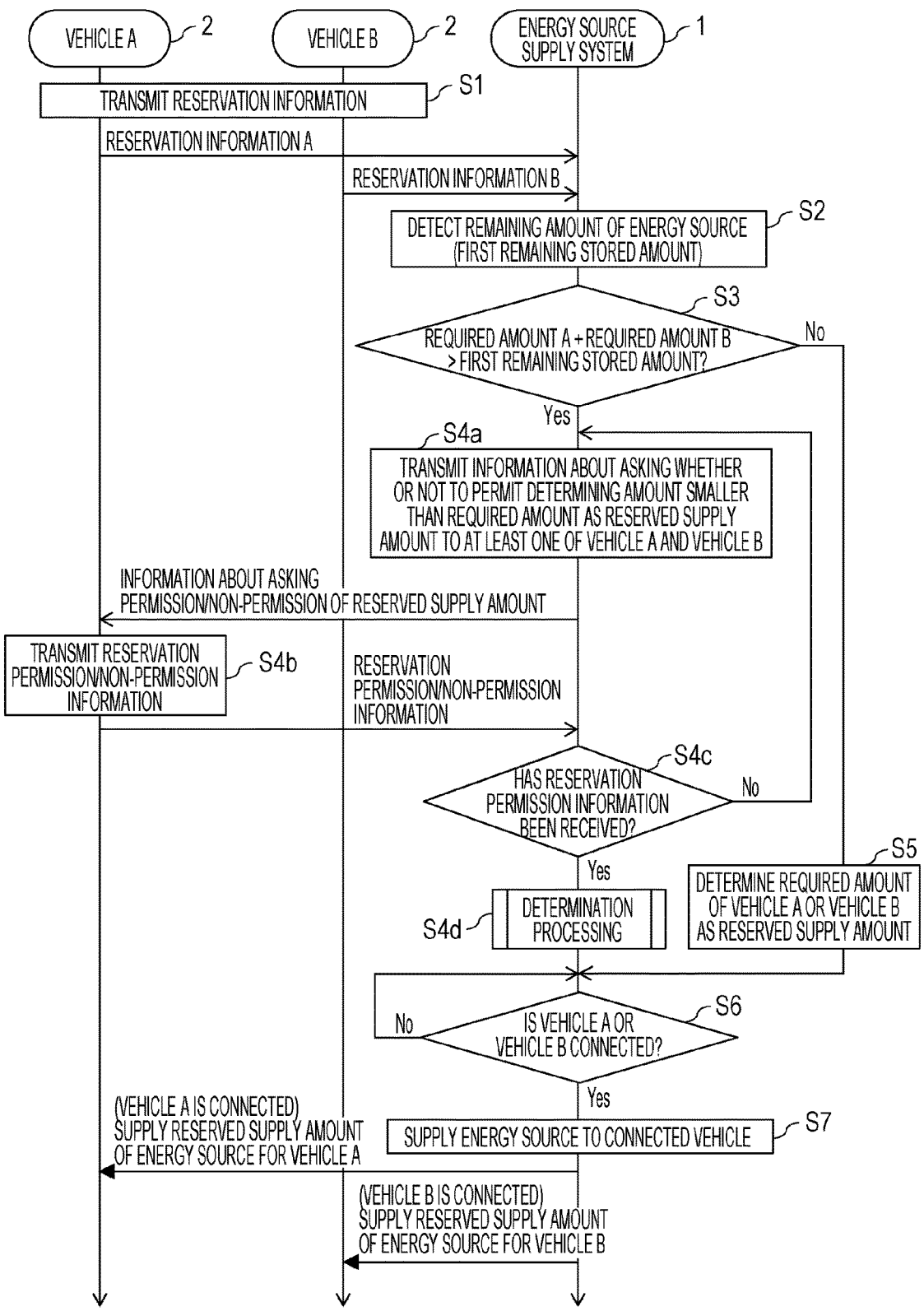
FIG. 11 is a diagram illustrating a modification of the energy source supply method according to the first embodiment.

FIG. 11 is a diagram illustrating a modification of the energy source supply method according to the first embodiment. Portions similar to those explained above with reference to FIG. 2 will be omitted. In processing (S4a to S4d) before the determination processing for determining a reserved supply amount, first, the controller 6 transmits information about asking whether or not to permit determining an amount smaller than a required amount as a reserved supply amount to the vehicle communication unit 10 of at least one vehicle 2 from the communication unit 5 of the energy source supply system 1 (S4a). For example, transmission of the information about asking the permission is desirably performed before the at least one vehicle 2 reaches the energy source supply system 1. For example, a case where information about asking the permission is transmitted to the vehicle A will be described below. The vehicle A which has received the information about asking the permission transmits reservation permission/non-permission information, which is information as to whether or not to permit determination of the reserved supply amount, to the communication unit 5 of the energy source supply system 1 from the vehicle communication unit 10 (S4b). When receiving the reservation permission information indicating permission of the determination of the reserved supply amount via the communication unit 5 (Yes in S4c), the controller 6 determines an amount smaller than the required amount as the reserved supply amount for the vehicle A from which the reservation permission information has been transmitted (S4d). In contrast, when receiving reservation non-permission information indicating non-permission of the determination of the reserved supply amount (No in S4c), the controller 6 may transmit information about asking whether or not to permit determining an amount smaller than the required amount as the reserved supply amount to the vehicle communication unit 10 of a different vehicle (S4a). For example, when receiving the reservation non-permission information from the vehicle A, the controller 6 may transmit information about asking whether or not to permit determining an amount smaller than the required amount as the reserved supply amount to the vehicle B. The determination of the reserved supply amount involving confirmation as to whether or not to permit the determination of the reserved supply amount is desirably completed before the vehicle A and the vehicle B reach the energy source supply system 1.

With this method, by notifying in advance a vehicle of being supplied with an amount of energy source smaller than the required amount, which is the supply amount of energy source required by the vehicle, a user of the vehicle may be notified in advance that the remaining amount of energy source stored in the energy source supply system 1 is not sufficient for the required amount. Thus, the user may be prevented from being unsatisfied with supply of an amount of energy source smaller than the required amount. Furthermore, an amount of energy source smaller than a required amount is supplied only to a vehicle from which reservation permission information has been received, and therefore, supply of energy source may be achieved more efficiently.

Furthermore, reservation information received from each of two or more vehicles may include an asking price for buying the energy source. In this case, a larger amount of energy source may be determined as a reserved supply amount for a vehicle presenting a higher asking price. Specifically, in the determination processing (S4*d* in FIG. 11) for determining a reserved supply amount, a larger amount of energy source may be determined as the reserved supply amount of a vehicle presenting a relatively high asking purchase price among the two or more vehicles, compared to a vehicle presenting a relatively low asking price. In this case, the required amount of a vehicle presenting a relatively high asking price among the two or more vehicles may be determined as the reserved supply amount of the vehicle, and an amount of energy source smaller than the required amount of a vehicle presenting a relatively low asking price may be determined as the reserved supply amount of energy source of the vehicle. After that, in the processing (S7 in FIG. 11) for supplying energy source to the connected vehicle, the reserved supply amount of energy source corresponding to the connected vehicle may be sold at the asking price presented by the vehicle and supplied to the vehicle.

With this method, in the case where two or more vehicles require the energy source supply system to supply an energy source, by receiving an asking price for the energy source from each of the two or more vehicles, reserved supply amounts of energy source of the vehicles to be supplied with energy source may be determined in accordance with priority levels based on the asking price. That is, the user of a vehicle is able to transmit the degree of requirement for the energy source, which is reflected in an asking price, to the energy source supply system, and a larger amount of energy source may be preferentially supplied to a vehicle presenting a relatively high degree of requirement for the energy source, in accordance with the determination of the reserved supply amount of energy source based on the asking price.

The amount of energy source determined as the reserved supply amount of a vehicle presenting a relatively low asking price among the two or more vehicles may be zero. That is, the energy source may be supplied only to a vehicle presenting a relatively high asking price. In this case, the amount of energy source to be supplied to a vehicle presenting a relatively low asking price is zero. With this method, supplying an energy source to a vehicle at an extremely low price may be suppressed, and therefore, a higher profit may be achieved by the energy source supply system.

Furthermore, the controller 6 may provide an incentive to a user of a vehicle for which an supply amount of energy source smaller than the required amount is determined as a reserved supply amount. That is, the controller 6 may register in the memory 7 information for providing an incentive to the user of the vehicle in association with the registered account information of the vehicle. For example, the controller 6 may register information of a point corresponding to the account information in the memory 7 and increase the number of points as an incentive. The point may be usable as a usage fee for the energy source supply system. Furthermore, for example, information indicating that an amount equivalent to a part of the usage fee is returned to a bank account corresponding to the account information may be stored, in association with the account information, in the memory 7. With this method, supply of an amount of energy source smaller than a required amount may be prompted, and therefore, the number of vehicles that cannot receive an energy source may be reliably reduced. Furthermore, a user of a vehicle that is supplied with an amount of energy source smaller than the required amount may be prevented from being unsatisfied, and therefore, repetitive use of the energy source supply system 1 may be prompted.

In the first embodiment, in the case where the total sum of required amounts of two or more vehicles is larger than a first remaining amount of the energy source supply system 1, control for reducing the amount of energy source to be supplied to at least one vehicle of the two or more vehicles is performed. However, similar control may be performed also in the case where the total sum of requirement amounts is equal to the first remaining amount of the energy source supply system 1. For example, in the case where the total sum of required amounts is equal to the first remaining amount of the energy source supply system 1 or in the case where the first remaining amount of the energy source supply system 1 is larger than the total sum of required amounts by a predetermined value, or in other cases, similar control may be performed. In such cases, by performing control for reducing the amount of energy source to be supplied to at least one vehicle, even after the energy source is supplied to the vehicle, the remaining amount of energy source of the energy source supply system 1 may be secured. Therefore, the number of vehicles that cannot receive supply of an energy source may further be reduced.

Second Embodiment

[Configuration of Energy Source Supply System]

Figure 12:
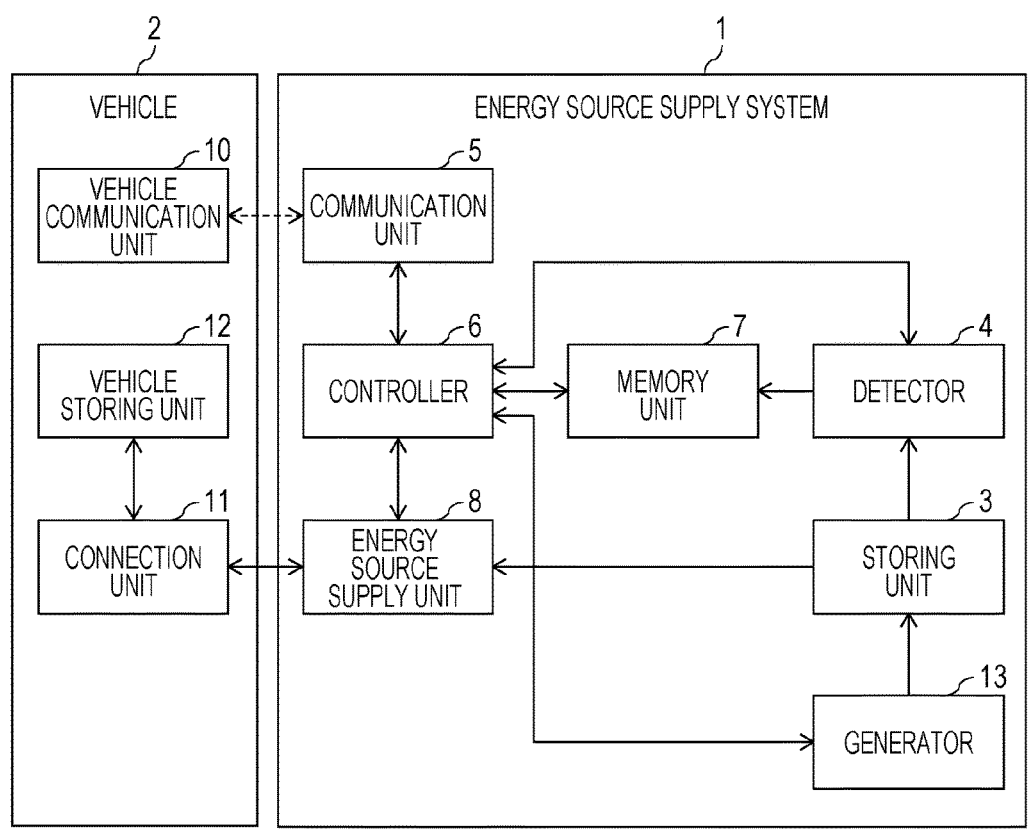
FIG. 12 is a block diagram illustrating a configuration of an energy source supply system according to a second embodiment.

FIG. 12 is a block diagram illustrating a configuration of the energy source supply system 1 according to a second embodiment. In the explanation of the second embodiment provided below, component elements referred to with the same reference signs as those in the above drawings are the same or similar component elements, and therefore, detailed explanation for those component elements will be omitted. Furthermore, explanation of points similar to those in the first embodiment will be omitted. As illustrated in FIG. 5, the energy source supply system 1 according to the second embodiment is different from the energy source supply system 1 according to the first embodiment in that the energy source supply system 1 according to the vehicle 2 includes a generator 13 which generates an energy source.

The generator 13 includes a configuration to generate an energy source to be supplied to the vehicle 2. The generator 13 may be, for example, in the case where an energy source is hydrogen gas, a reformer for generating hydrogen-bearing gas by reforming reaction of methane-bearing gas or methane gas such as city gas, a CO remover for removing carbon monoxide from generated hydrogen-bearing gas, a water electrolysis device for electrolyzing water to generate hydrogen gas, a device for performing hydrogen fermentation of sludge or biomass raw materials to generate hydrogen, or the like. In the case where an energy source is hydrogen gas, the generator 13 is not limited to the above configuration as long as the generator 13 is able to generate hydrogen-bearing gas. Furthermore, the generator 13 may include a configuration to generate an energy source, which is not limited to hydrogen gas, for driving a vehicle. The generator 13 may be a solar panel or the like. An energy source generated by the generator 13 is stored in the storage reservoir 3.

[Energy Source Supply Method]

Figure 13:
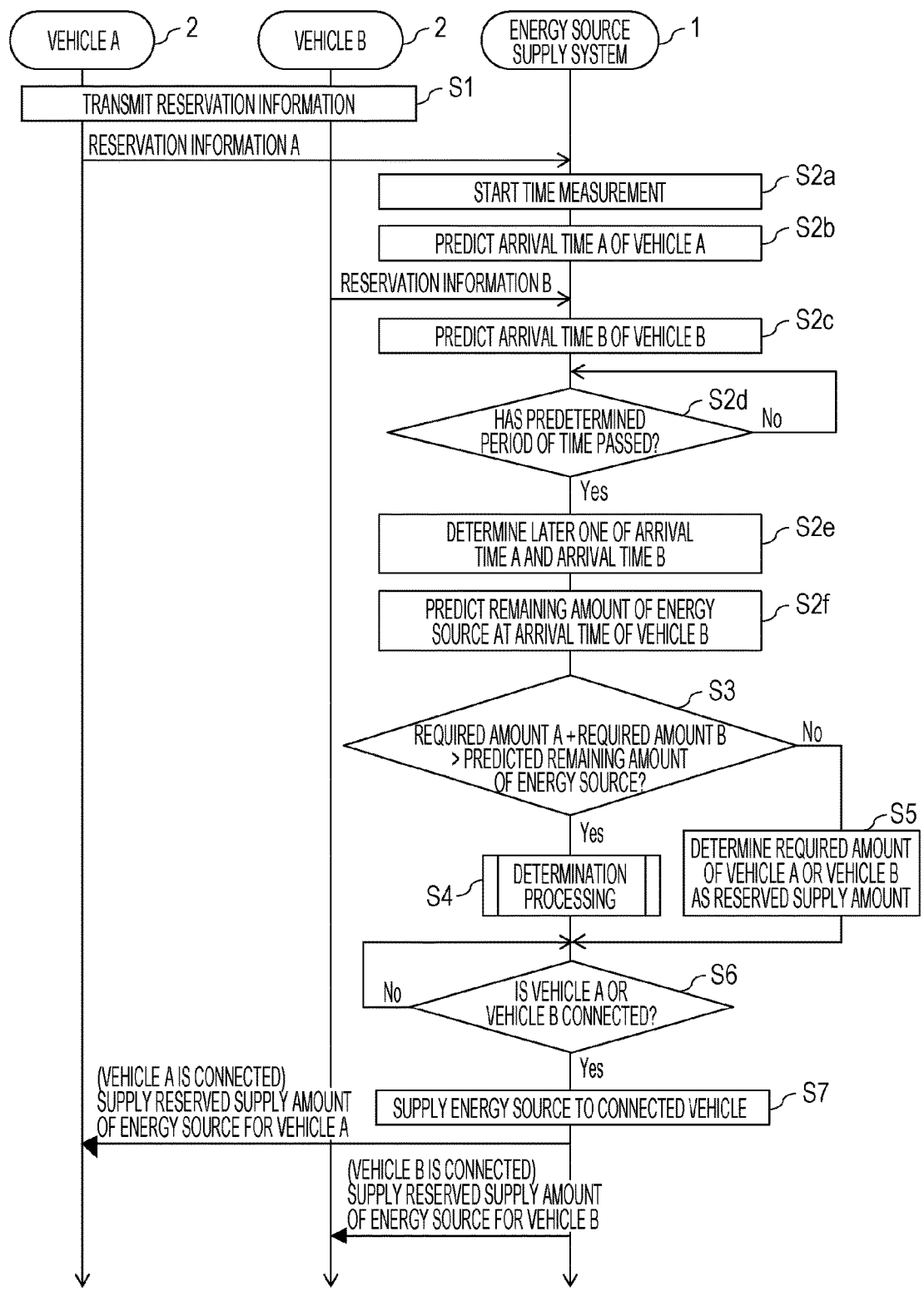
FIG. 13 is a diagram illustrating an energy source supply method according to the second embodiment.

FIG. 13 is a diagram illustrating an energy source supply method according to the second embodiment. Explanation for portions similar to those described above in the first embodiment (refer to FIG. 2) will be omitted. A supply method used for the vehicle 2 to receive supply of an energy source using the energy source supply system 1 will be described below for a case where two or more vehicles 2, that is, the vehicle A and the vehicle B, receive supply of the energy source.

As illustrated in FIG. 13, the controller 6 of the energy source supply system 1 according to the second embodiment receives reservation information from the vehicle communication unit 10 of each of the vehicle A and the vehicle B via the communication unit 5. The reservation information includes identification information for identifying the vehicle A and the vehicle B, the type of energy source required by the vehicle A and the vehicle B, and the required supply amount of energy source, that is, a required amount. Furthermore, the reservation information includes positional information of the vehicle A and the vehicle B at the time when the reservation information is transmitted. As described later, the controller 6 of the energy source supply system 1 predicts the arrival time at which each of the vehicle A and the vehicle B reaches the energy source supply system 1, in accordance with the positional information of the vehicle A and the vehicle B included in the received reservation information. Alternatively, the reservation information may include arrival time information indicating the time at which each of the vehicle A and the vehicle B reaches the energy source supply system 1.

When receiving reservation information from the vehicle A (S1), the controller 6 controls a time measurement unit (not illustrated in FIG. 12) to detect the time at which the reservation information was received. Next, the controller 6 controls the time measurement unit to start counting the elapsed time since reception of the reservation information of the vehicle A (S2a). Furthermore, the controller 6 predicts the arrival time of the vehicle A, based on positional information of the vehicle A included in the reservation information received from the vehicle A (S2b). When receiving reservation information from the vehicle B, the controller 6 predicts, in a similar manner, the arrival time of the vehicle B, based on positional information of the vehicle B included in the reservation information received from the vehicle B (S2c). The, the controller 6 determines whether or not the elapsed time since reception of the reservation information of the vehicle A is more than a predetermined period of time (S2d). In the case where the predetermined period of time has not passed since the reception of the reservation information of the vehicle A (No in S2d), the determination is repeated until the predetermined period of time has passed. In the case where the predetermined period of time has passed since the reception of the reservation information of the vehicle A (Yes in S2d), determination processing for a reserved supply amount is performed for a vehicle from which reservation information has been received by the point in time. A case where reservation information is received from only the vehicle A and the vehicle B within the predetermined period of time will be described below.

Next, the controller 6 determines the later one of the arrival time A and the arrival time B (S2e). In the second embodiment, the vehicle B reaches the energy source supply system 1 after the vehicle A reaches the energy source supply system 1. Next, the remaining amount of energy source stored in the storage reservoir 3 at the arrival time B of the vehicle B, which is the later arrival time (S2f). A remaining amount schedule of the energy source indicating a predicted remaining amount of energy source at the arrival time B of the vehicle B is created, based on the first remaining amount in the storage reservoir 3 detected by the detector 4 when the arrival time B of the vehicle B is predicted, the arrival time B of the vehicle B, and the energy source generation efficiency of the generator 13. Then, the generated remaining amount schedule is stored in the memory 7. The predicted remaining amount of energy source at the arrival time B represents the amount of energy source predicted to be stored in the storage reservoir 3 at the arrival time B. Furthermore, in the second embodiment, the energy source generation efficiency of the generator 13 represents the amount of energy source generated by the generator 13 per unit time. However, the energy source generation efficiency may be configured by a combination of parameters other than the time and the amount of energy source. Furthermore, the energy source remaining amount schedule may be created based on the arrival time A of the vehicle A, the required amount A of the vehicle A, and the required amount B of the vehicle B. Moreover, creation of the energy source remaining amount schedule is desirably completed before the vehicle A and the vehicle B reach the energy source supply system 1.

An example of the energy source remaining amount schedule will be described in detail with reference to FIG. 14. FIG. 14 is a diagram illustrating an example of a table of the energy source remaining amount schedule according to the second embodiment. As illustrated in FIG. 14, an energy source remaining amount schedule 7e includes fields representing the current first remaining amount, vehicle identification information, the vehicle arrival time, the predicted remaining amount of energy source, a required amount, and a reserved supply amount.

In the field for the current first remaining amount, the first remaining amount of the storage reservoir 3 at the point in time when the arrival time B is predicted may be registered. The first remaining amount of the storage reservoir 3 at the point in time when the energy source remaining amount schedule 7e is created may be registered.

In the field for the vehicle identification information, information which may identify the vehicle A and the vehicle B, the information including the registration number of each of the vehicle A and the vehicle B, an identification number unique to the vehicle communication unit 10 of each of the vehicle A and the vehicle B, and the like may be registered as the vehicle identification information.

In the field for the vehicle arrival time, the time at which each of the vehicle A and the vehicle B is scheduled to reach the energy source supply system 1 is registered. Such a time may be calculated by a device of the vehicle based on the position of the vehicle at a point in time when reservation information is transmitted from each of the vehicle A and the vehicle B. Furthermore, the time may be calculated by the controller 6 of the energy source supply system 1 based on positional information at a point in time when the reservation information received from each of the vehicle A and the vehicle B is transmitted.

Figure 15:
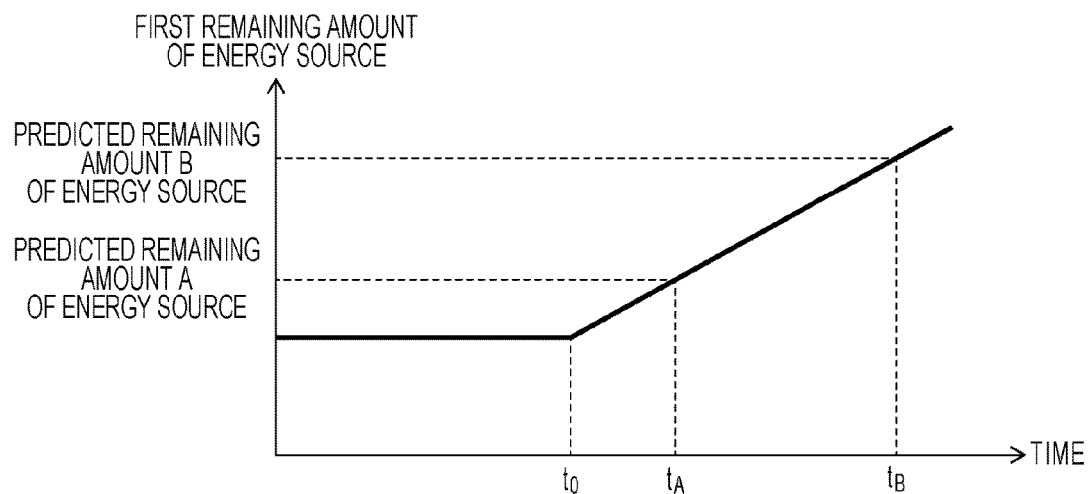
FIG. 15 is a diagram illustrating an example of variations in a remaining amount of the energy source supply system according to the second embodiment.

In the field for the predicted remaining amount of energy source, the remaining amount of energy source predicted to be stored in the storage reservoir 3 at the arrival times of the vehicle A and the vehicle B may be registered. Prediction, that is, calculation, of the predicted remaining amount of energy source will be described with reference to FIG. 15. First, the predicted remaining amount A of energy source at the vehicle arrival time of the vehicle A may be obtained as described below. First, the amount of energy source that may be generated between the current time, that is, the time ($t_0$) at which the energy source remaining amount schedule is created, and the vehicle arrival time ($t_A$) of the vehicle A is calculated. Next, the amount of energy source that may be generated is added to the current first remaining amount.

Accordingly, the predicted remaining amount of energy source may be calculated and predicted. The amount of energy source that may be generated may be obtained by multiplying the generation efficiency of energy source at the generator 13 by the time between the current time ($t_0$) and the vehicle arrival time ($t_A$) of the vehicle A. Next, the amount of energy source that may be generated between the current time, that is, the time ($t_0$) at which the energy source remaining amount schedule is created, and the vehicle arrival time ($t_B$) of the vehicle B. The predicted remaining amount B of energy source at the vehicle arrival time of the vehicle B may be calculated and predicted by adding the amount of energy source that may be generated to the current first remaining amount. Although the remaining amount of energy source at the arrival time of each of the vehicle A and the vehicle B is predicted in this example, at least the predicted remaining amount B of energy source at the arrival time ($t_B$) of the vehicle B may be calculated.

In the field for the required amount, a required amount, which is the supply amount of energy source required by each of the vehicle A and the vehicle B, is registered in association with the vehicle identification information.

In the field for the reserved supply amount, a reserved supply amount, which is the amount of energy source scheduled to be supplied to each of the vehicle A and the vehicle B, the amount of energy source being determined by the controller 6, is registered in association with the vehicle identification information.

In the energy source remaining amount schedule 7e, the predicted remaining amount B of energy source at the vehicle arrival time B of the vehicle B may be predicted and registered. All the above fields are not necessarily provided.

Next, the controller 6 refers to the energy source remaining amount schedule 7e, and compares the total sum of required amounts of two or more vehicles with the predicted remaining amount of energy source (S3). Explanation for a case where the total sum of the required amount A required by the vehicle A and the required amount B required by the vehicle B is compared with the predicted remaining amount of energy source at the arrival time of the vehicle B will be provided for the vehicle A and the vehicle B.

In the case where the total sum of the required amount A and the required amount B is larger than the predicted remaining amount of energy source at the arrival time of the vehicle B (Yes in S3), the controller 6 determines an amount smaller than the required amount A of the vehicle A or the required amount B of the vehicle B as the reserved supply amount of the corresponding vehicle (determination processing of S4). In this processing, the controller 6 creates a reservation management table. Furthermore, the controller 6 causes the memory 7 to store the reserved supply amount. Not only for the vehicle A but also for the vehicle B, the controller 6 may determine the supply amount of energy source smaller than the required amount B may be determined as the reserved supply amount of the vehicle B. That is, the controller 6 may determine an amount smaller than at least one of the required amount of the vehicle A and the required amount of the vehicle B as the reserved supply amount of the corresponding vehicle (S4). In the case where the total sum of the required amount received from the vehicle A and the required amount received from the vehicle B is smaller than or equal to the predicted remaining amount of energy source at the arrival time of the vehicle B (No in S3), the controller 6 determines the required amount A received from the vehicle A as the reserved supply amount A, and determines the required amount B received from the vehicle B as the reserved supply amount B (S5). The determination of the reserved supply amount of the vehicle A and the reserved supply amount of the vehicle B is desirably completed before the vehicle A and the vehicle B reach the energy source supply system 1.

As described above, with the energy source supply method according to the second embodiment, in the energy source supply system 1 including the generator 13, in the case where the remaining amount of energy source at the arrival time of a second vehicle reaching the energy source supply system at the latest time among two or more vehicles is predicted to be smaller than the total sum of the required amounts of the two or more vehicles, the number of vehicles that cannot receive supply of the energy source may be reliably suppressed. By calculating and predicting the predicted remaining amount of energy source at the vehicle arrival time, based on the remaining amount of energy source and the energy source generation efficiency of the generator 13, the number of vehicles that cannot receive supply of the energy source may be reduced more reliably.

The energy source supply system 1 according to the second embodiment may not include the generator 13. In this case, the energy source supply system 1 may use an external energy source supply system (not illustrated in FIG. 12) for supplying an energy source to the storage reservoir 3. That is, an energy source may be supplied regularly to the storage reservoir 3 from the external energy source supply system.

In the case where an energy source is supplied to the storage reservoir 3 from the external energy source supply system, the controller 6 of the energy source supply system 1 may create the remaining amount schedule of the energy source representing the predicted remaining amount of energy source at the arrival time B of the vehicle B, based on the first remaining amount in the storage reservoir 3 detected by the detector 4 when the vehicle B predicts the arrival time B of the vehicle B, the arrival time B of the vehicle B, the time at which the energy source is supplied from the external energy source supply system to the storage reservoir 3, and the amount of energy source supplied from the external energy source supply system to the storage reservoir 3, and cause the memory 7 to store the energy source remaining amount schedule. In the second embodiment, the amount of energy source supplied from the external energy source supply amount represents the amount of energy source supplied per unit time. However, the supply amount of energy source may be configured by a combination of parameters other than the time and the amount of energy source. Furthermore, the energy source remaining amount schedule may be created based on the arrival time A of the vehicle A, the required amount A of the vehicle A, and the required amount B of the vehicle B. Moreover, creation of the energy source remaining amount schedule is desirably completed before the vehicle A and the vehicle B reach the energy source supply system 1.

Figure 16:
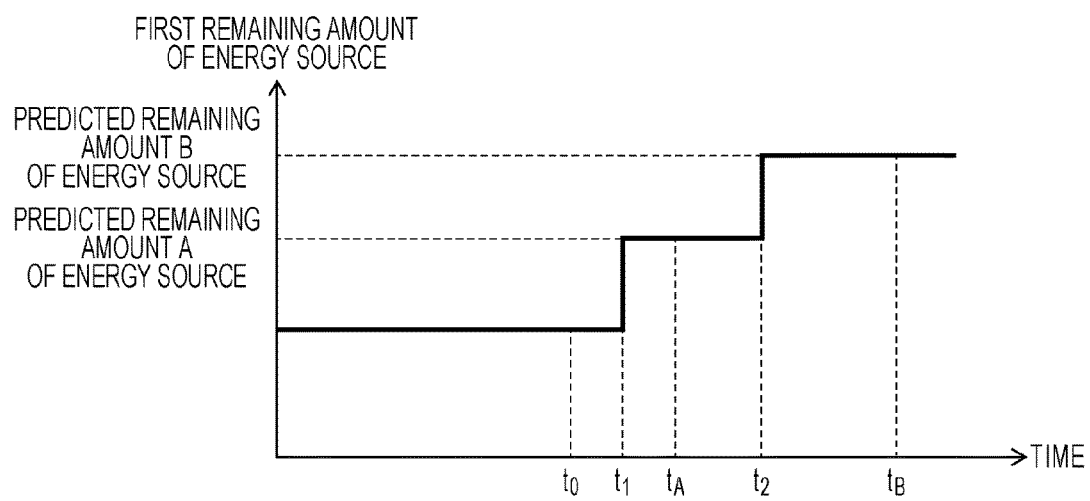
FIG. 16 is a diagram illustrating another example of the variations in the remaining amount of the energy source supply system according to the second embodiment.

An example of prediction of the predicted remaining amount of energy source will be described below with reference to FIG. 16. First, the amount of energy source that may be supplied between the current time, that is, the time ($t_0$) at which an energy source remaining amount schedule is created, and the vehicle arrival time ($t_A$) of the vehicle A is calculated. The predicted remaining amount of energy source at the vehicle arrival time of the vehicle A may be calculated and predicted by adding the amount of energy source that may be supplied to the current first remaining amount. The amount of energy source that may be supplied may be calculated based on the supply times ($t_1$ and $t_2$) at which the energy source is supplied from the external energy source supply system to the storage reservoir 3 and the supply amount of energy source. Next, the amount of energy source that may be supplied between the current time, that is, the time ($t_0$) at which the energy source remaining amount schedule is created, and the vehicle arrival time ($t_B$) of the vehicle B is created. The predicted remaining amount of energy source at the vehicle arrival time of the vehicle B may be calculated and predicted by adding the amount of energy source that may be supplied to the current first remaining amount.

With this method, in the energy source supply system 1 to which an energy source is supplied from an external energy source supply system, in the case where the remaining amount of energy source at the arrival time of a second vehicle reaching the energy source supply system at the latest time among two or more vehicles is predicted to be smaller than the total sum of required amounts of the two or more vehicles, the number of vehicles that cannot receive supply of the energy source may be suppressed more reliably.

As the determination processing (S4 of FIG. 13) of the energy source supply method according to the second embodiment, the determination processing 3 and the determination processing 4 in the first embodiment may be used. Determination processing different from the determination processing 3 and the determination processing 4 will be described below with reference to FIGS. 17 and 18.

Figure 17:
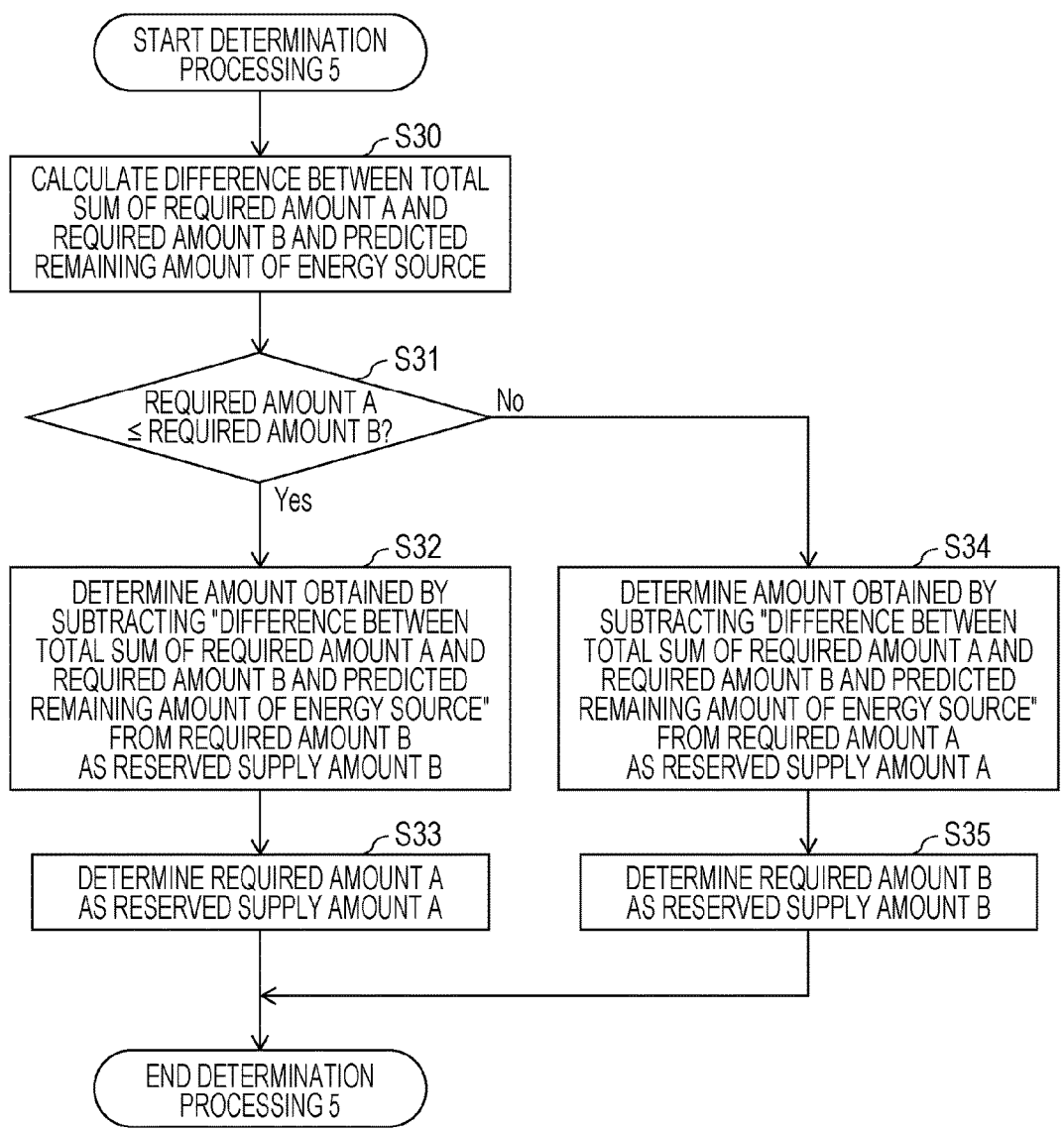
FIG. 17 is a diagram illustrating an example of determination processing of the energy source supply method according to the second embodiment.

FIG. 17 is a diagram illustrating an example of determination processing of the energy source supply method according to the second embodiment.

In determination processing 5 illustrated in FIG. 17, first, the controller 6 calculates the difference between the total sum of the required amount A and the required amount B and the predicted remaining amount of energy source (S30). Next, the controller 6 compares the required amount A with the required amount B (S31). In the case where the required amount B is equal to or larger than the required amount A (Yes in S31), the controller 6 determines the amount obtained by subtracting the difference between the total sum of the required amount A and the required amount B and the remaining amount of energy source from the required amount B as the reserved supply amount B (S32). Furthermore, the controller 6 determines the required amount A as the reserved supply amount A (S33). In contrast, in the case where the required amount B is smaller than the required amount A (No in S31), the controller 6 determines the amount obtained by subtracting the difference between the total sum of the required amount A and the required amount B and the remaining amount of energy source from the required amount A as the reserved supply amount A (S34). Furthermore, the controller 6 determines the required amount B as the reserved supply amount A (S35). By the determination processing 5 described above, an amount smaller than the required amount of the vehicle A or the required amount of the vehicle B may be determined as the reserved supply amount of the corresponding vehicle.

Figure 18:
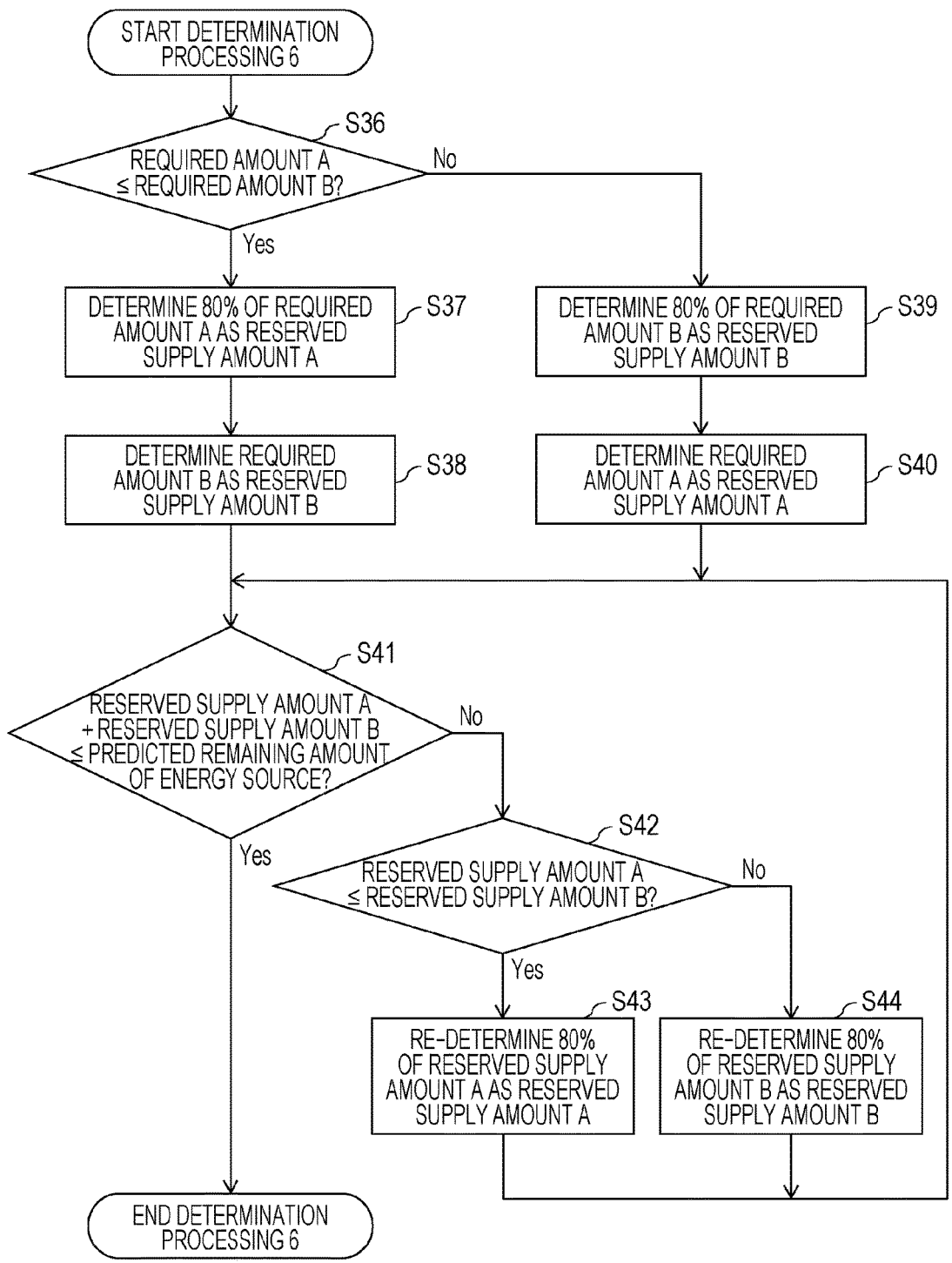
FIG. 18 is a diagram illustrating another example of the determination processing of the energy source supply method according to the second embodiment.

FIG. 18 is a diagram illustrating another example of the determination processing of the energy source supply method according to the first embodiment.

In determination processing 6 illustrated in FIG. 18, first, the controller 6 compares the required amount A received from the vehicle A with the required amount B received from the vehicle B (S36). In the case where the required amount B is equal to or larger than the required amount A (Yes in S36), 80% of the required amount A is determined as the reserved supply amount A (S37). Furthermore, the required amount B is determined as the reserved supply amount B (S38). In contrast, in the case where the required amount B is smaller than the required amount A (No in S36), 80% of the required amount B is determined as the reserved supply amount B (S39). Furthermore, the required amount A is determined as the reserved supply amount A (S40).

Next, the total sum of the reserved supply amount A and the reserved supply amount B is compared with the predicted remaining amount of energy source (S41). In the case where the total sum of the reserved supply amount A and the reserved supply amount B is smaller than or equal to the predicted remaining amount of energy source (Yes in S41), the determination processing 6 ends. In contrast, in the case where the total sum of the reserved supply amount A and the reserved supply amount B is larger than the predicted remaining amount of energy source (No in S41), the reserved supply amount A is compared with the reserved supply amount B (S42). In the case where the reserved supply amount A is smaller than or equal to the reserved supply amount B (Yes in S42), 80% of the reserved supply amount A is re-determined as the reserved supply amount A (S43). After the re-determination of the reserved supply amount A, the total sum of the reserved supply amount A and the reserved supply amount B is compared with the predicted remaining amount of energy source (S41). In contrast, in the case where the reserved supply amount A is larger than the reserved supply amount B (No in S42), 80% of the reserved supply amount B is re-determined as the reserved supply amount B (S44). After the re-determination of the reserved supply amount B, the total sum of the reserved supply amount A and the reserved supply amount B is compared with the predicted remaining amount of energy source (S41).

Furthermore, in the energy source supply method according to the second embodiment, an effective period may be set based on arrival time information of a vehicle. In this case, in the case where a vehicle is connected to a supply device within the effective period, the supply device may supply the reserved supply amount of energy source corresponding to vehicle identification information to the vehicle. That is, only in the case where a vehicle reaches the energy source supply system and is connected to the supply device within the effective period, the reserved supply amount of energy source may be supplied to the vehicle. If the vehicle is not connected to the supply device within the effective period, reservation of the energy source for the vehicle may be deleted, and the reserved supply amount of energy source may be determined again for other vehicles.

With this method, a user may be prompted to reach the energy source supply system within the effective period. That is, a situation in which an energy source is not supplied in spite of reservation due to non-arrival of the vehicle at the energy source supply system may be reduced, and a proper use of the energy source supply system may be prompted. Furthermore, a situation in which an energy source unexpectedly remains may be suppressed, and therefore, loss of the energy source supply system may be reduced.

Third Embodiment

[Energy Source Supply Method]

Figure 19:
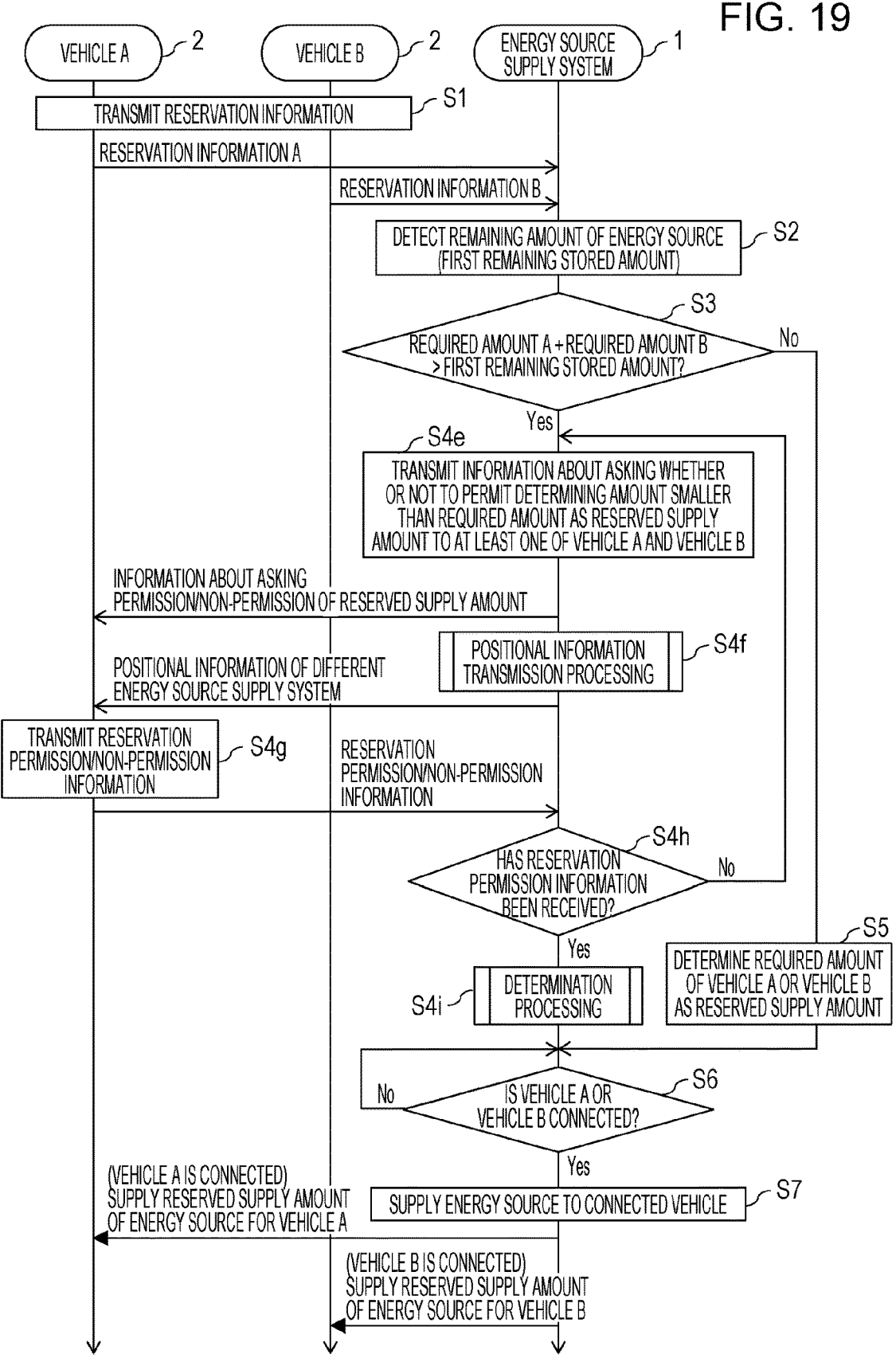
FIG. 19 is a diagram illustrating an energy source supply method according to a third embodiment.

FIG. 19 is a diagram illustrating an example of an energy source supply method according to a third embodiment. Explanation for portions similar to those explained above in the first or second embodiment will be omitted. Furthermore, a configuration of the energy source supply system 1 is similar to that of the first or second embodiment, and therefore, explanation for the configuration of the energy source supply system 1 will be omitted.

Processing (S4e to S4i) before determination processing for determining a reserved supply amount will be described in detail below for a case where the total sum of the required amount received from the vehicle A and the required amount received from the vehicle B is larger than the first remaining amount of the energy source supply system 1.

First, the controller 6 of the energy source supply system 1 transmits information about asking whether or not to permit determining an amount smaller than a required amount as a reserved supply amount to the vehicle communication unit 10 of at least one vehicle via the communication unit 5 (S4e).

In this processing, the memory 7 stores positional information of a different energy source supply system. Then, the controller 6 performs positional information transmission processing for transmitting the positional information of the different energy source supply system to the vehicle communication unit 10 of the at least one vehicle via the communication unit 5 (S4f).

For example, in the case where the information about asking whether or not to permit the reserved supply amount and the positional information of the different energy source supply system to the vehicle A, the vehicle A, which has received the positional information of the different energy source supply system, transmits reservation permission/non-permission information, which is information indicating whether or not to permit determining the reserved supply amount, to the communication unit 5 of the energy source supply system 1 from the vehicle communication unit 10 (S4g). When receiving the reservation permission information indicating permission of determination of the reserved supply amount via the communication unit 5 (Yes in S4h), the controller 6 performs determination processing for determining an amount smaller than a required amount as a reserved supply amount for the vehicle A from which the reservation permission information has been transmitted (S4i). In contrast, when receiving reservation non-permission information indicating non-permission of determination of the reserved supply amount (No in S4h), the controller 6 may transmit information about asking whether or not to permit determining an amount smaller than a required amount as a reserved supply amount and the positional information of the different energy source supply system to the vehicle communication unit 10 of a different vehicle 2 (S4e and S4f). For example, when receiving reservation non-permission information from the vehicle A, the controller 6 may transmit information about asking whether or not to permit determining an amount smaller than a required amount as a reserved supply amount and the positional information of the different energy source supply system to the vehicle B. Confirmation of whether or not to permit determining a reserved supply amount, transmission of positional information of a different energy source supply system, and later determination of a reserved supply amount are desirably completed before the vehicle A and the vehicle B reach the energy source supply system 1.

Furthermore, response information to the information about asking whether or not to permit reservation transmitted from a vehicle may include information indicating that the vehicle declines reception of supply of the energy source from the energy source supply system 1 by selecting a different energy source supply system. In the case where the vehicle declines reception of supply of the energy source from the energy source supply system 1, the controller 6 may process the response information as reservation permission information and set a reserved supply amount for the vehicle to 0. Furthermore, a reserved supply amount may be reset for each vehicle in accordance with the above determination.

With this method, in the case where the remaining amount of energy source in the storage reservoir 3 of the energy source supply system 1 is not sufficient for the amount required by a vehicle, positional information of a different energy source supply system is transmitted. Accordingly, a vehicle requiring supply of an energy source is prompted to be supplied with the energy source from the different energy source supply system, and concentration of vehicles on the energy source supply system 1 may be avoided. Therefore, the number of vehicles that cannot receive supply of an energy source may be reduced.

Figure 20:
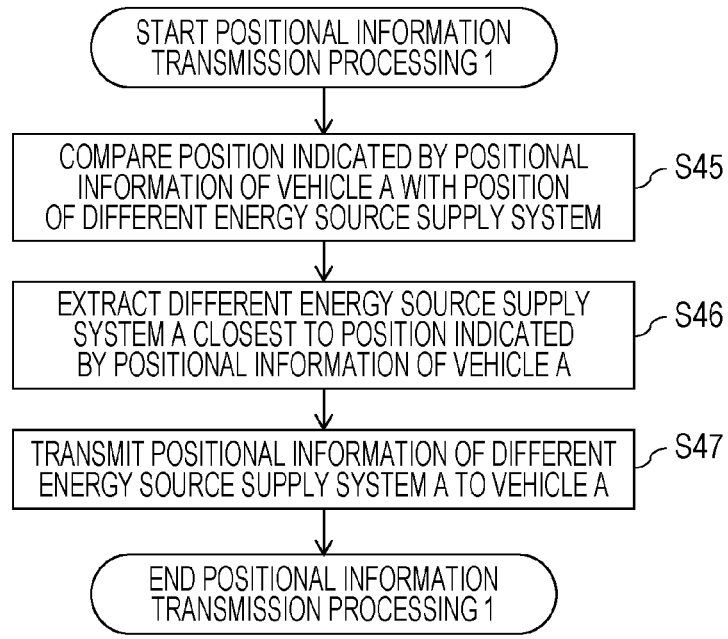
FIG. 20 is a diagram illustrating an example of positional information transmission processing of the energy source supply method according to the third embodiment.

Furthermore, reservation information transmitted from the vehicle A and the vehicle B may include positional information of the vehicle A and the vehicle B. Positional information transmission processing of a different energy source supply system will be described below with reference to FIG. 20. FIG. 20 is a diagram illustrating positional information transmission processing 1, which is an example of positional information transmission processing in the energy source supply method according to the third embodiment. First, a position indicated by positional information of the vehicle A is compared with a position of a different energy source supply system (S45). Next, a different energy source supply system A closest to the position indicated by the positional information of the vehicle A is extracted (S46). The positional information of the different energy source supply system is transmitted to the vehicle A (S47). As described above, the controller 6 may refer to the positional information of the different energy source supply system stored in the memory 7 and transmit to the vehicle communication unit 10 of at least one vehicle from the communication unit 5 the positional information of the different energy source supply system closest to the current position of the vehicle.

With this method, in the case where the remaining amount of energy source in the storage reservoir 3 of the energy source supply system 1 is not sufficient for the amount required by a vehicle, the vehicle requiring supply of the energy source is prompted to be supplied with the energy source from a different energy source supply system closest to the vehicle. Therefore, concentration of vehicles on the energy source supply system 1 may be avoided, and the number of vehicles that cannot receive supply of the energy source may further be reduced. At this time, by notifying the vehicle of the position of the nearest different energy source supply system, movement necessary for the vehicle to receive supply of the energy source may be reduced to as few as possible.

Figure 21:
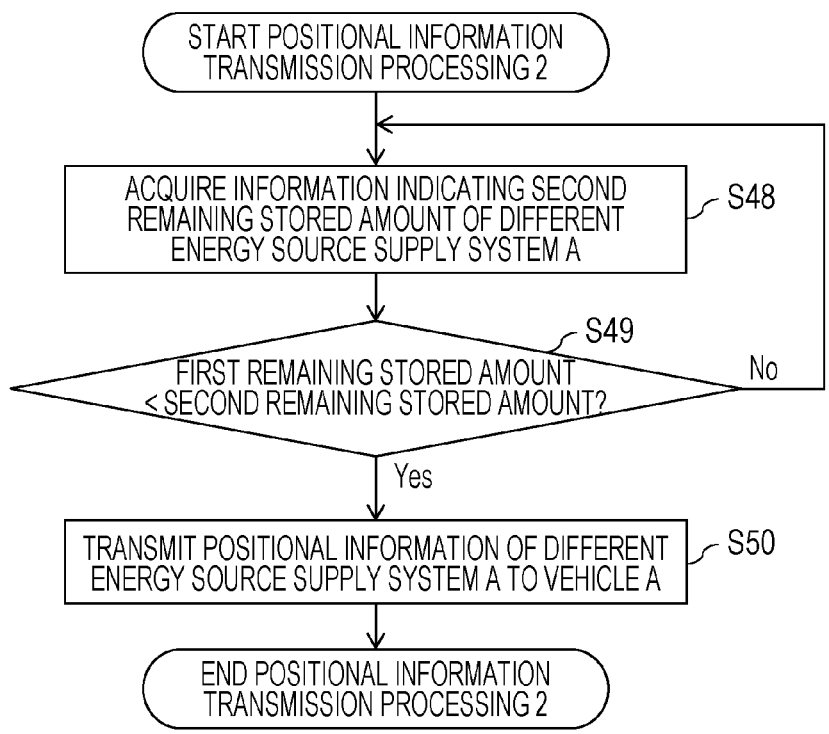
FIG. 21 is a diagram illustrating another example of the positional information transmission processing of the energy source supply method according to the third embodiment.

Furthermore, the controller 6 may receive a different energy source remaining amount, that is, a second remaining amount, which is the remaining amount of energy source stored in one energy source supply system among different energy source supply systems, from the one different energy source supply system and store the second remaining amount in the memory 7. In this case, the controller 6 compares the first remaining amount, which is the remaining amount of energy source of the energy source supply system 1, with the second remaining amount, which is the remaining amount of energy source of the one energy source supply system, by referring to the memory 7. Next, the controller 6 may transmit positional information of the one energy source supply system with the second remaining amount larger than the first remaining amount to the vehicle communication unit 10 of at last one vehicle from the communication unit 5. Specific positional information transmission processing will be described below with reference to FIG. 21. FIG. 21 is a diagram illustrating positional information transmission processing 2, which is another example of the positional information transmission processing of the energy source supply method according to the third embodiment. First, information indicating the second remaining amount of a different energy source supply system A is acquired (S48). Next, the controller 6 compares the first remaining amount, which is the remaining amount of the energy source supply system 1, with the second remaining amount of the energy source stored in one energy source supply system among the different energy source supply systems (S49). In the case where the first remaining amount is smaller than the second remaining amount (Yes in S49), positional information of the one energy source supply system is transmitted to the vehicle A (S50). In the case where the first remaining amount is equal to or larger than the second remaining amount (No in S50), information indicating the second remaining amount is acquired from one different energy source supply system among the different energy source supply systems (S48). The controller 6 may receive second remaining amounts from a plurality of different energy source supply systems via the communication unit 5. Furthermore, the memory 7 may store positional information and second remaining amounts of a plurality of different energy source supply systems.

With this method, in the case where the remaining amount of energy source in the energy source supply system 1 is not sufficient for the amount required by a vehicle, positional information of a different energy source supply system with a remaining amount of energy source larger than the energy source supply system 1 is transmitted to the vehicle requiring supply of the energy source. Accordingly, supply of the energy source from the different energy source supply system may be prompted. Therefore, concentration of vehicles on the energy source supply system 1 may be avoided, and the number of vehicles that cannot receive supply of an energy source may further be reduced.

(Other Modifications)

As described above, as illustration of techniques disclosed in the present disclosure, embodiments have been described. However, the techniques according to the present disclosure are not limited to these embodiments, and are also applicable in an appropriate manner to modifications or other embodiments where modifications, replacement, additions, omissions, and the like are made. Furthermore, each of the component elements described in the above embodiments and the modifications described below may be combined to form a new embodiment or modification.

In the energy source supply system 1 according to an embodiment or a modification, when determining an amount smaller than a required amount as a reserved supply amount for a vehicle, the controller 6 may consider information regarding the vehicle other than the vehicle remaining amount of energy source and vehicle positional information.

For example, the controller 6 may consider fuel consumption information, which is information regarding the performance of a vehicle. In this case, the controller 6 may identify the vehicle type, specifications, and the like of the vehicle, based on vehicle identification information received from the vehicle, and acquire fuel consumption information. Alternatively, the controller 6 may directly receive fuel consumption information from the vehicle during traveling via the vehicle communication unit 10. For a vehicle with a better fuel consumption, the controller 6 may set a larger amount by which the reserved supply amount is smaller than the required amount.

Furthermore, in the case where the vehicle communication unit 10 of a vehicle is a car navigation system, the controller 6 may consider a scheduled traveling route for the vehicle for determination of a reserved supply amount. In this case, the controller 6 may acquire a scheduled traveling route from the vehicle communication unit 10. Then, the controller 6 identifies positional information of different energy source supply system on or close to the scheduled traveling route for the vehicle. Furthermore, for a vehicle whose scheduled traveling route represents a longer distance to the different energy source supply system closest to the energy source supply system 1 including the controller 6, the controller 6 may set a smaller amount by which the reserved supply amount is smaller than the required amount.

Furthermore, in determination of the reserved supply amount, the controller 6 may consider the traffic conditions of a scheduled traveling route for the vehicle as well as the schedule traveling route. The controller 6 may acquire the traffic conditions of the scheduled traveling route from a public or private information providing service via the Internet, wireless communication, or the like. For a vehicle whose scheduled traveling route represents a higher congestion degree, the controller 6 may set a smaller amount by which the reserved supply amount is smaller than the required amount.

Furthermore, in the energy source supply system 1 according to the embodiments and modifications, the controller 6 may stop reception of a new request for an energy source from a vehicle when a difference between a reserved supply amount set for each of a plurality of vehicles and a required amount of each of the plurality of vehicles is larger than a predetermined value or the ratio of the reserved supply amount to the required amount is lower than a predetermined ratio. Accordingly, a situation in which the amount of energy supplied to a vehicle from which a required for supply has already been received becomes too small may be suppressed.

As described above, embodiments and modifications have been described as techniques according to the present disclosure. For the embodiments and modifications, the drawings are attached and the detailed description is provided. Accordingly, the component elements described in the attached drawings and the detailed description may include not only component elements which are essential for solving the problems but also component elements which are not essential for solving the problems but are introduced for exemplifying the above techniques. Hence, the component elements, which are not essential and are included in the attached drawings and the description, shall not be instantly recognized as essential ones. Furthermore, the embodiments and modifications are for exemplifying the techniques according to the present disclosure, and therefore may include various modifications, replacement, additions, omissions, and the like which are equivalent to and within the scope of the claims.

The present disclosure may be used for a method for supplying an energy source to a vehicle and an energy source supply system.

What is claimed is:

1. A control method for an energy source supply system, the energy supply system including
   a storage reservoir that stores an energy source,
   a supply device that supplies the energy source to one or more vehicles, and a detector that detects a remaining amount of the energy source stored in the storage reservoir, the control method comprising:

receiving, by a network adapter and from a first vehicle, first reservation information including i) first identification information identifying the first vehicle and ii) a first required amount of the energy source required by the first vehicle;

receiving, by the network adapter and from a second vehicle, second reservation information including i) second identification information identifying the second vehicle and ii) a second required amount of the energy source required by the second vehicle;

acquiring, from the detector, a value indicating a first remaining amount, which is the remaining amount of the energy source stored in the storage reservoir;

determining, by at least one of hardware or a processor and in a case where a total sum of required amounts of the energy source received from two or more vehicles including the first vehicle and the second vehicle is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being within a range where a total sum of the first reserved supply amount and the second reserved supply amount does not exceed the first remaining amount;

controlling, by the at least one of the hardware or the processor, when the first vehicle is connected to the supply device, the supply device to supply to the first vehicle an amount of the energy source corresponding to the first reserved supply amount from the storage reservoir; and controlling, by the at least one of the hardware or the processor, when the second vehicle is connected to the supply device, the supply device to supply to the second vehicle an amount of the energy source corresponding to the second reserved supply amount from the storage reservoir, wherein, in the determining, the at least one of the hardware or the processor further determines the first reserved supply amount and the second reserved supply amount so that a difference between the second required amount and the second reserved supply amount is smaller than a difference between the first reserved supply amount and the first required amount in a case where the second vehicle includes a longer distance to a different energy source along a scheduled traveling route than the first vehicle.

2. The control method for the energy source supply system according to claim 1, wherein in accordance with a ratio of the first required amount to the second required amount, the first reserved supply amount of the energy source and the second reserved supply amount of the energy source are determined.

3. The control method for the energy source supply system according to claim 1, wherein the first reservation information further includes information indicating a shortage to a first full amount of the energy source which can be supplied to a vehicle storage reservoir of the first vehicle, wherein the second reservation information further includes information indicating a shortage to a second full amount of the energy source which can be supplied to a vehicle storage reservoir of the second vehicle, and wherein in accordance with a ratio of the shortage to the first full amount to the shortage to the second full amount, the first reserved supply amount of the energy source and the second reserved supply amount of the energy source are determined.

4. The control method for the energy source supply system according to claim 1, wherein the first reservation information and the second reservation information are received within a predetermined period of time.

5. The control method for the energy source supply system according to claim 1, further comprising:

transmitting, by the network adapter and to the first vehicle, information about asking a user of the first vehicle whether or not to accept an amount smaller than the first required amount as the first reserved supply amount for the first vehicle.

6. The control method for the energy source supply system according to claim 1, wherein the energy source supply system further includes a memory that registers first account information of a user of the first vehicle, wherein the first reservation information includes the first account information, and wherein the control method further comprises:

registering, in the memory, incentive information providing an incentive to the user of the first vehicle in association with the first account information.

7. The control method for the energy source supply system according to claim 1, wherein the energy source supply system further includes a memory that stores positional information for one or more different energy source supply systems which are different from the energy source supply system, and wherein the control method comprises:

transmitting to at least one of the first vehicle and the second vehicle, the positional information for at least one of the one or more different energy source supply systems.

8. The control method for the energy source supply system according to claim 1, wherein the first reservation information further includes a first asking price for buying the energy source, wherein the second reservation information further includes a second asking price for buying the energy source, and wherein in accordance with a ratio of the first asking price to the second asking price, the first reserved supply amount of the energy source and the second reserved supply amount of the energy source are determined.

9. A control method for an energy source supply system, the energy supply system including a storage reservoir that stores an energy source, a supply device that supplies the energy source to one or more vehicles, a detector that detects a remaining amount of the energy source stored in the storage reservoir, and a memory that stores positional information for one or more different energy source supply systems which are different from the energy source supply system, the control method comprising:
receiving, by a network adapter and from a first vehicle, first reservation information including i) first identification information identifying the first vehicle and ii) a first required amount of the energy source required by the first vehicle;
receiving, by the network adapter and from a second vehicle, second reservation information including i) second identification information identifying the second vehicle and ii) a second required amount of the energy source required by the second vehicle;
acquiring, from the detector, a value indicating a first remaining amount, which is a remaining amount of the energy source stored in the storage reservoir;
determining, in a case where a total sum of required amounts of the energy source received from two or more vehicles including the first vehicle and the second vehicle is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being within a range where a total sum of the first reserved supply amount and the second reserved supply amount does not exceed the first remaining amount;
controlling, by at least one of hardware or a processor, when the first vehicle is connected to the supply device, the supply device to supply to the first vehicle an amount of the energy source corresponding to the first reserved supply amount from the storage reservoir; and
controlling, by the at least one of the hardware or the processor, when the second vehicle is connected to the supply device, the supply device to supply to the second vehicle an amount of the energy source corresponding to the second reserved supply amount from the storage reservoir,
wherein the first reservation information further includes first positional information indicating a position of the first vehicle at a time when the energy source is required at the first vehicle,
wherein the second reservation information further includes second positional information indicating a position of the second vehicle at a time when the energy source is required at the second vehicle,
wherein the control method further comprises:
transmitting, by the network adapter and to at least one of the first vehicle and the second vehicle, the positional information for at least one of the one or more different energy source supply systems, and
wherein the transmitting includes at least one of i) transmitting, by the network adapter and to the first vehicle, positional information of a first different energy source supply system closest to the position indicated by the first positional information among the one or more different energy source supply systems and ii) transmitting, by the network adapter and to the second vehicle positional information of a second different energy source supply system closest to the position indicated by the second positional information among the one or more different energy source supply systems.

10. A control method for an energy source supply system, the energy supply system including
a storage reservoir that stores an energy source,
a supply device that supplies the energy source to one or more vehicles,
a detector that detects a remaining amount of the energy source stored in the storage reservoir, and
a memory that stores positional information for one or more different energy source supply systems which are different from the energy source supply system,
the control method comprising:
receiving, by a network adapter and from a first vehicle, first reservation information including i) first identification information identifying the first vehicle and ii) a first required amount of the energy source required by the first vehicle;
receiving, by the network adapter and from a second vehicle, second reservation information including i) second identification information identifying the second vehicle and ii) a second required amount of the energy source required by the second vehicle;
acquiring, from the detector, a value indicating a first remaining amount, which is a remaining amount of the energy source stored in the storage reservoir;
determining, in a case where a total sum of required amounts of the energy source received from two or more vehicles including the first vehicle and the second vehicle is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being within a range where a total sum of the first reserved supply amount and the second reserved supply amount does not exceed the first remaining amount;
controlling, by at least one of hardware or a processor, when the first vehicle is connected to the supply device, the supply device to supply to the first vehicle an amount of the energy source corresponding to the first reserved supply amount from the storage reservoir; and
controlling, by the at least one of the hardware or the processor, when the second vehicle is connected to the supply device, the supply device to supply to the second vehicle an amount of the energy source corresponding to the second reserved supply amount from the storage reservoir;
acquiring from one energy source supply system among the one or more different energy source supply systems, information indicating a second remaining amount, which is a remaining amount of the energy source stored in the one energy source supply system; and
transmitting, by the network adapter and to at least one of the first vehicle and the second vehicle, the positional information for at least one of the one or more different energy source supply systems,
wherein the transmitting includes transmitting, by the network adapter and to at least one of the first vehicle and the second vehicle, positional information of the one energy source supply system, in a case where the second remaining amount is larger than the first remaining amount.

11. An energy source supply system, comprising:
a storage reservoir that stores an energy source;
a supply device that supplies the energy source to one or more vehicles;
communication circuitry:
that receives, from a first vehicle, first reservation information including i) first identification information identifying the first vehicle and ii) a first required amount of the energy source required by the first vehicle; and
that receives, from a second vehicle, second reservation information including i) second identification information identifying the second vehicle and ii) a second required amount of the energy source required by the second vehicle;
a detector that detects a first remaining amount, which is a remaining amount of the energy source stored in the storage reservoir; and
a controller,
wherein the controller
determines, in a case where a total sum of the first required amount and the second required amount is larger than the first remaining amount, i) a first reserved supply amount of the energy source which is to be supplied to the first vehicle, wherein the first reserved supply amount is smaller than the first required amount, and ii) a second reserved supply amount of the energy source which is to be supplied to the second vehicle, wherein the second reserved supply amount is smaller than or equal to the second required amount, the second reserved supply amount being within a range where a total sum of the first reserved supply amount and the second reserved supply amount does not exceed the first remaining amount,
controls, when the first vehicle is connected to the supply device, the supply device to supply to the first vehicle an amount of the energy source corresponding to the first reserved supply amount from the storage reservoir, and
controls, when the second vehicle is connected to the supply device, the supply device to supply to the second vehicle an amount of the energy source corresponding to the second reserved supply amount from the storage reservoir, and
wherein the controller further determines the first reserved supply amount and the second reserved supply amount so that a difference between the second required amount and the second reserved supply amount is smaller than a difference between the first reserved supply amount and the first required amount in a case where the second vehicle includes a longer distance to a different energy source along a scheduled traveling route than the first vehicle.

12. A control method for an energy source supply system, the energy supply system including
a storage reservoir that stores an energy source,
a supply device that supplies the energy source to one or more vehicles, and
a detector that detects a remaining amount of the energy source stored in the storing reservoir,
the control method comprising:
receiving, by a network adapter and from a first vehicle, first reservation information including i) first identification information identifying the first vehicle and ii) a first required amount of the energy source required by the first vehicle;
receiving, by the network adapter and from a second vehicle, second reservation information including i) second identification information identifying the second vehicle and ii) a second required amount of the energy source required by the second vehicle;
acquiring, from the detector, a value indicating a first remaining amount, which is the remaining amount of the energy source stored in the storage reservoir;
determining, by at least one of hardware or a processor and in a case where a total sum of required amounts of the energy source received from two or more vehicles including the first vehicle and the second vehicle is larger than the first remaining amount, i) a first reserved supply amount of the energy source which is to be supplied to the first vehicle and ii) a second reserved supply amount of the energy source which is to be supplied to the second vehicle, in accordance with a ratio of the first required amount to the second required amount;
controlling, by the at least one of the hardware or the processor, when the first vehicle is connected to the supply device, the supply device to supply to the first vehicle an amount of the energy source corresponding to the first reserved supply amount from the storage reservoir; and
controlling, by the at least one of the hardware or the processor, when the second vehicle is connected to the supply device, the supply device to supply to the second vehicle an amount of the energy source corresponding to the second reserved supply amount from the storage reservoir,
wherein, in the determining, the at least one of the hardware or the processor further determines the first reserved supply amount and the second reserved supply amount so that a difference between the first required amount and the first reserved supply amount is smaller than a difference between the second reserved supply amount and the second required amount in a case where the first vehicle includes a longer distance to a different energy source along a scheduled traveling route than the second vehicle.

13. A control method for an energy source supply system, the energy supply system including
a storage reservoir that stores an energy source,
a supply device that supplies the energy source to one or more vehicles, and
a detector that detects a remaining amount of the energy source stored in the storing reservoir,
the control method comprising:
receiving, by a network adapter and from a first vehicle, first reservation information including i) first identification information identifying the first vehicle, ii) a first required amount of the energy source required by the first vehicle, and iii) information indicating a shortage to a first full amount of the energy source which can be supplied to a vehicle storage reservoir of the first vehicle;
receiving, by the network adapter and from a second vehicle, second reservation information including i) second identification information identifying the second vehicle, ii) a second required amount of the energy source required by the second vehicle, and iii) information indicating a shortage to a second full amount of the energy source which can be supplied to a vehicle storage reservoir of the second vehicle;

acquiring, from the detector, a value indicating a first remaining amount, which is the remaining amount of the energy source stored in the storage reservoir;

determining, by at least one of hardware or a processor, in a case where a total sum of required amounts of the energy source received from two or more vehicles including the first vehicle and the second vehicle is larger than the first remaining amount, i) a first reserved supply amount of the energy source which is to be supplied to the first vehicle and ii) a second reserved supply amount of the energy source which is to be supplied to the second vehicle, in accordance with a ratio of the shortage to the first full amount to the shortage to the second full amount;

controlling, by the at least one of the hardware or the processor, when the first vehicle is connected to the supply device, the supply device to supply to the first vehicle an amount of the energy source corresponding to the first reserved supply amount from the storage reservoir; and controlling, by the at least one of the hardware or the processor, when the second vehicle is connected to the supply device, the supply device to supply to the second vehicle an amount of the energy source corresponding to the second reserved supply amount from the storage reservoir, wherein, in the determining, the at least one of the hardware or the processor further determines the first reserved supply amount and the second reserved supply amount so that a difference between the first required amount and the first reserved supply amount is smaller than a difference between the second reserved supply amount and the second required amount in a case where the first vehicle includes a longer distance to a different energy source along a scheduled traveling route than the second vehicle.

* * * * *